US012333453B2

United States Patent
Oberländer et al.

(10) Patent No.: US 12,333,453 B2
(45) Date of Patent: Jun. 17, 2025

(54) METHOD AND APPARATUS FOR TRANSFERRING ACCESS INFORMATION TO A BOX INSTALLATION USING A FIRST MODE OF COMMUNICATION

(71) Applicants: Philipp Oberländer, Bonn (DE); Thomas Baye, Bonn (DE); Marko Dietrich, Cologne (DE)

(72) Inventors: Philipp Oberländer, Bonn (DE); Thomas Baye, Bonn (DE); Marko Dietrich, Cologne (DE)

(73) Assignee: Deutsche Post AG, Bonn (DE)

( * ) Notice: Subject to any disclaimer, the term of this patent is extended or adjusted under 35 U.S.C. 154(b) by 89 days.

(21) Appl. No.: 17/890,004

(22) Filed: Aug. 17, 2022

(65) Prior Publication Data
US 2023/0054036 A1   Feb. 23, 2023

(30) Foreign Application Priority Data
Aug. 17, 2021   (DE) ..................... 10 2021 121 374.6

(51) Int. Cl.
*G06Q 10/02*   (2012.01)
*G07C 9/20*   (2020.01)

(52) U.S. Cl.
CPC .............. *G06Q 10/02* (2013.01); *G07C 9/20* (2020.01)

(58) Field of Classification Search
CPC .................................. G06Q 10/02; G07C 9/20
USPC ....................................................... 340/5.61
See application file for complete search history.

(56) References Cited

U.S. PATENT DOCUMENTS

| | | | |
|---|---|---|---|
| 2003/0222760 A1* | 12/2003 | Hara | G07F 17/0042 340/5.73 |
| 2004/0199284 A1* | 10/2004 | Hara | G07F 17/13 700/215 |
| 2005/0083176 A1* | 4/2005 | Yamada | G06Q 10/02 705/16 |
| 2016/0260271 A1* | 9/2016 | Belhadia | G06F 21/35 |
| 2019/0102962 A1* | 4/2019 | Miller | G07C 9/00309 |
| 2021/0216619 A1 | 7/2021 | Helferich et al. | |

FOREIGN PATENT DOCUMENTS

| | | | |
|---|---|---|---|
| CN | 103632243 A | * | 3/2014 |
| CN | 104584026 A | | 4/2015 |
| CN | 107483715 A | | 12/2017 |
| EP | 3171338 A2 | | 5/2017 |
| EP | 3333810 A1 | | 6/2018 |

OTHER PUBLICATIONS

U.S. Appl. No. 17/722,489, Helferich et al., filed Apr. 18, 2022.

* cited by examiner

*Primary Examiner* — Kam Wan Ma
(74) *Attorney, Agent, or Firm* — Reinhart Boerner Van Deuren P.C.

(57) ABSTRACT

Disclosed is a method in which first information from an apparatus or a system is obtained. The first information is used to determine a first mode of communication for transferring access information to a box installation. Using the first information, the first mode of communication for transferring the access information to the box installation is determined. The access information is transferred to the box installation using the first mode of communication in order to obtain access to the box installation. Further, apparatuses and computer programs that are able to control and/or perform the respective methods are disclosed.

21 Claims, 7 Drawing Sheets

METHOD AND APPARATUS FOR TRANSFERRING ACCESS INFORMATION TO A BOX INSTALLATION USING A FIRST MODE OF COMMUNICATION

CROSS-REFERENCE TO RELATED PATENT APPLICATIONS

This patent application claims priority to German Patent Application No. 102021121374.6, filed Aug. 17, 2021, the entire teachings and disclosures of which are incorporated herein by reference thereto.

FIELD

Illustrative embodiments of the invention relate to methods, apparatuses, systems and computer programs for transferring access information to a box installation using a first mode of communication in order to obtain access to one or more boxes of the box installation, the box installation being in particular a box installation for collecting and/or depositing consignments from delivery or distribution services.

BACKGROUND

Box installations, for example in the form of locker installations or parcel box installations, are used in diverse ways. An example of a parcel box installation is the applicant's packing station, which is usable in various scenarios.

By way of example, a recipient may have consignments delivered to the packing station. The consignment is put into a box in a packing station that is situated close to the recipient and/or stipulated by the recipient beforehand by the delivery agent, the box is sealed and the recipient is notified accordingly. So that the notified recipient is able to remove a consignment provided for him from a box of the box installation, the box installation needs to confirm that the recipient is authorized to obtain access to one or more boxes of the box installation.

In one implementation of the scenario cited above, when providing evidence of his authorization to access a box or multiple boxes, the recipient needs to input a user identifier, also called a postal number, that is permanently functionally associated with him as a customer number and also a temporarily valid collection code into an input device, for example a numerical keypad, of the packing station. The temporarily valid collection code, which is known from the applicant's aforementioned implementation as an mTAN (mobile transaction number), has been electronically transferred to the person beforehand together with the notification that one or more consignments are ready for him to collect in the designated packing station.

In a different scenario, although a recipient ordered the consignment to his address, the delivery was unsuccessful, e.g. because the recipient was not home at the time of the delivery. A delivery agent may then leave a notification card made of paper or send an electronic notification card to the smartphone of the recipient and deposit the consignment in a packing station for collection. The notification card then contains information that the recipient needs to transfer to the packing station so that the packing station can use this information to confirm that the recipient is authorized to obtain access to one or more boxes of the box installation.

The respective information may be transferred to a box installation in different ways in principle. For example, a recipient may input the collection code obtained in the first scenario by means of a keypad or a touch-sensitive screen at the box installation. In the second scenario, the notification card may comprise a QR code, for example, that is scanned by the box installation. However, the transfer is hampered by the fact that not every box installation necessarily supports every mode of communication. That is to say that, by way of example, some box installations have no keypad or no touch-sensitive screen, whereas other box installations have no scanner for capturing QR codes. In one implementation of the applicant's packing station cited above, a recipient who is at the packing station in order to collect a consignment therefore first needs to look at the packing station and, on the basis of the design of the packing station or a marking of the packing station, to determine which modes of communication this packing station supports. The user then uses an app on his smartphone, for example, to select how the app e.g. is supposed to present the collection code so that the box installation can obtain said code (e.g. alphanumerically for input by the recipient on a keypad, QR code for scanning by the box installation), or whether the smartphone is supposed to transfer the collection code directly to the box installation (e.g. via Bluetooth).

BRIEF SUMMARY

In regard to a box installation, it is fundamentally desirable for said box installation to be able to reliably and efficiently confirm that a user is authorized to obtain access to one or more boxes of the box installation so as subsequently to grant access to the applicable boxes.

The method known hitherto may be prone to error in various scenarios, however, because the user's determination of which modes of communication a box installation supports may be unreliable. For example, some users are unable to distinguish between different types of box installations or are careless and select a mode of communication for communication with a box installation that the box installation does not support. In such a situation, the box installation is then unable to confirm that the user is authorized to obtain access to one or more boxes of the box installation, for example. The interaction between the box installation and the device of a user therefore does not always work reliably.

Moreover, in the case described above, a failed authentication of a user to a box installation must be repeated, which significantly increases the amount of time needed by the box installation to confirm that the user is authorized to obtain access to one or more boxes of the box installation. This may entail losses of efficiency.

Furthermore, the method known to date is not always highly efficient even if the authentication succeeds first time. If for example a user needs to look for his spectacles in his bag in order to read information from the box installation and to input said information into an app on his device, this may be time-consuming.

The present invention is therefore based on the object of overcoming one or more of the disadvantages described above and/or of obtaining one or more of the advantages described above and/or of achieving one or more of the desired improvements described above.

According to a first illustrative aspect of the invention, a method is disclosed that for example is performed by a mobile apparatus, e.g. a smartphone or a handheld scanner, the method comprising: obtaining first information from an apparatus or a system, the first information being usable to determine a first mode of communication for transferring access information to a box installation; determining, using the first information, the first mode of communication for transferring the access information to the box installation; transferring the access information to the box installation using the first mode of communication in order to obtain access to one or more boxes of the box installation.

According to a second illustrative aspect of the invention, a method is disclosed that for example is performed by a box installation, the method comprising: outputting first information to an apparatus or a system that transfers the first information to a mobile apparatus in order to allow the mobile apparatus to use the first information to determine a first mode of communication for transferring access information to the box installation; obtaining the access information using the first mode of communication, the first mode of communication having been determined using the first information; confirming whether the access information authorizes access to one or more boxes of the box installation; and granting access to one or more boxes of the box installation, a necessary condition for the granting of access being that it has been confirmed that the access information authorizes access to the one or more boxes of the box installation.

According to a third illustrative aspect of the invention, a method is disclosed that for example is performed by an apparatus, e.g. a server, or a system, e.g. an IT backend system, the method comprising: obtaining or storing first information, the first information being usable to determine a first mode of communication for transferring access information to a box installation; transferring the first information to a mobile apparatus in order to allow the mobile apparatus to use the first information to determine the first mode of communication for transferring the access information to the box installation.

According to each of the aforementioned aspects of the invention, the following are moreover disclosed in each case:

a computer program comprising program instructions that cause a processor to perform and/or control the method according to the respective aspect of the invention when the computer program runs on the processor. In this specification, a processor is intended to be understood to mean, inter alia, control units, microprocessors, microcontrol units such as microcontrollers, digital signal processors (DSPs), application-specific integrated circuits (ASICs) or field programmable gate arrays (FPGAs). In this case, either all steps of the method may be controlled, or all steps of the method may be performed, or one or more steps may be controlled and one or more steps may be performed. The computer program may be distributable, by way of example, via a network such as the Internet, a telephone or mobile radio network and/or a local area network. The computer program may be at least in part software and/or firmware of a processor. It may equally be implemented at least in part as hardware. By way of example, the computer program may be stored on a computer-readable storage medium, e.g. a magnetic, electrical, optical and/or other kind of storage medium. By way of example, the storage medium may be part of the processor, for example a (nonvolatile or volatile) program memory of the processor or a portion thereof. By way of example, the storage medium may be a substantive or physical storage medium.

An apparatus or a system comprising two, three or more apparatuses, the apparatus, or the system, configured to perform and/or control the method according to the respective aspect of the invention or comprising respective means for performing and/or controlling the steps of the method according to the respective aspect of the invention. This may involve either all the steps of the method being controlled, or all the steps of the method being performed, or one or more steps being controlled and one or more steps being performed. One or more of the means may also be implemented and/or controlled by the same unit. By way of example, one or more of the means may be formed by one or more processors. By way of example, an apparatus according to the first aspect of the invention may be a mobile apparatus, for example a smartphone, e.g. of a recipient, or a handheld scanner, e.g. of a distributor or delivery agent. An apparatus according to the first aspect of the invention may for example also be a laptop or another electronic device, however. An apparatus according to the second aspect of the invention may be a box installation, for example. An apparatus according to the third aspect of the invention may be a server, for example. A server may for example also be understood to mean a portion of a server such as a logical or functional unit. A server is therefore in particular also intended to be understood to mean a system comprising multiple apparatuses that together provide a server function, for example a server cloud. In illustrative embodiments, each of the apparatuses described above may collaborate with one or more further apparatuses to perform and/or control the method according to the respective aspect of the invention. An apparatus that performs and/or controls the method according to the first aspect of the invention may do so for example with the support of or in collaboration with a further apparatus, for example a server that performs (intermediate) steps of the method. The same applies accordingly to apparatuses that perform methods according to a respective other aspect of the invention.

An apparatus that comprises at least one processor and at least one memory that contains program code, wherein the memory and the program code are configured to cause an apparatus having the at least one processor to perform and/or control at least the method according to the respective aspect of the invention. This may involve either all the steps of the method being controlled, or all the steps of the method being performed, or one or more steps being controlled and one or more steps being performed.

The various illustrative aspects of the present invention may have the properties described below, inter alia.

The box installation comprises a plurality of boxes (that is to say more than one box or more than two boxes, for example). The boxes are configured to receive consignments (e.g. letters, parcels, packages), deliveries (e.g. washed laundry or laundry to be washed, meals from delivery services (e.g. a pizza or sushi service), etc.) or items (e.g. valuables, luggage, etc.), for example. The boxes are each sealable, for example by means of a respective door or shutter. By way of example, the boxes are substantially parallelepipedal receiving containers that have doors or shutters provided on one or more sides. By way of example, multiple boxes in the box installation are arranged above one another and/or beside one another. By way of example, the box installation may consist of one or more modules arranged beside one another, with one or more boxes in each module being arranged above one another. The respective doors of the boxes are then fixed on at the side, for example, and can be opened forward, for example. The boxes of the box installation may all have the same size. Alternatively, at least some boxes of the box installation may have different sizes. The box installation may have boxes for letters (pigeonholes) and/or boxes for parcels (parcel boxes), for example. The pigeonholes each have the same size within the box installation, for example, but two or more different sizes are also possible. The parcel boxes may be represented by just one identical size or by different sizes in the box installation. The box installation may be in the form of a parcel box installation or a combined pigeonhole and parcel box installation, for example.

Each of the boxes is provided with a respective lock, for example, in order to be able to control access by users to the individual boxes of the box installation. By way of example, the lock of a box may be arranged in or on the box, for example on a door (e.g. also in the form of a shutter) of the box. If the lock is not arranged on the door (that is to say on a lateral wall of the box, for example), then it interacts with the door, for example, by virtue of a bolt being introduced into an opening in the door and pulled out again, for example. The lock of a box may return to a locked position as standard, for example, and then be actuable only for unlocking purposes, for example. After the lock has been unlocked, it is then possible for the door of the box to be opened, for example. Since the lock automatically returns to the locked position, locking of the box can be achieved by closing the door, for example by virtue of a catch function of the lock being utilized when closing the door.

A box of the box installation may be either open or closed. In the open state of the box, the lock of the box is unlocked. The door of the box can then be opened by a person without the use of force, for example, or is open. In the closed state of the box, the lock of the box is locked, on the other hand. The door of the box can then no longer be opened by a person who is not authorized to open it without the use of force, for example.

The lock of a respective box is controllable, for example, in particular in electronic form. In particular, at least the process of locking and/or unlocking the lock may be controlled. The lock of a box may be controlled by a lock control unit, for example, with either each lock having an associated lock control unit of its own or a (for example central) lock control unit controlling some (e.g. those of a module of the box installation) or all locks of the box installation. In the former case, multiple lock control units, for example all the lock control units or those of one or more modules of the box installation, are controlled by a superordinate control unit, for example, whereas in the latter case there is respective wiring between the lock control unit and each of the locks controlled thereby, for example, with signals or applied voltages transmitted by way of respective wiring then being associated only with the respective lock to which the wiring leads, but not with other locks. Alternatively, the use of a bus to which the lock control unit and a plurality of locks are electrically connected is also conceivable. In that case, however, a unit for evaluating the control signals obtained by way of the bus is necessary in each lock, which makes the locks more complex and hence more expensive than in the case of the direct wiring.

A lock control unit (in particular the central lock control unit) is able not only to attend to the actuation of the lock or of the locks, for example, but also to confirm whether access information obtained provides authorization to access a box or multiple boxes of the box installation, and may accordingly grant access to the box or boxes (e.g. by unlocking the door of the box or the doors of the boxes) or deny access to the box or boxes (e.g. by virtue of the door of the box or the doors of the boxes not being unlocked).

The access information is obtained in the method according to the second aspect of the invention by using a first mode of communication. By way of example, this first mode of communication was previously determined by a mobile apparatus, which performs the method according to the first aspect of the invention, using first information. In that case, e.g. the mobile apparatus obtains the first information from an apparatus or a system performing the method according to the third aspect. The apparatus or the system in turn may have previously obtained the first information from the box installation, for example. In detail, this may take the form described below.

The method according to the second illustrative aspect comprises outputting first information, e.g. from a box installation, to an apparatus or a system that transfers the first information to a mobile apparatus in order to allow the mobile apparatus to use the first information to determine a first mode of communication for transferring access information to the box installation. The first information may be output using an Internet connection or a radio connection such as Bluetooth, NFC, WLAN, 4G or 5G. Moreover, the first information may be output for example as a reaction to a request e.g. from the apparatus or the system. Alternatively or additionally, the first information may be output for example only once, e.g. when the box installation is connected to a network and/or after any change in the configuration of the box installation. The first information may also be output after particular predetermined intervals of time.

The method according to the third illustrative aspect comprises, in particular as a counterpart to the output described above, obtaining or storing the first information, the first information being usable to determine a first mode of communication for transferring access information to a box installation. The "or" here should be understood as "and" or "either . . . or". The first information may be obtained analogously to the first information being output, i.e. in the manner described there. However, the first information may also be obtained for example by virtue of an input e.g. from a user on a keypad or on a touch-sensitive screen being captured. Additionally or alternatively, the first information may also be obtained e.g. by scanning an optical pattern, e.g. a barcode or QR code. The first information may be stored for example locally on a hard disk, e.g. permanently. However, the first information may also be stored e.g. in a cloud or in a manner distributed otherwise.

An apparatus or a system performing the method according to the third aspect of the invention may moreover obtain and/or store a plurality of pieces of first information, for example. Pieces of first information from the plurality of pieces of first information may then be associated with different box installations, for example. In particular, for example a respective piece of stored first information from the plurality of pieces of stored first information is usable to determine a respective first mode of communication for transferring respective access information to a respective box installation.

Besides obtaining or storing the first information, the method according to the third illustrative aspect comprises transferring the first information to a mobile apparatus in order to allow the mobile apparatus to use the first information to determine the first mode of communication for transferring the access information to the box installation. The first information may be transferred for example directly or indirectly using an Internet connection or a radio connection such as Bluetooth, NFC, WLAN, 4G or 5G. Like all transfers described in this application, this transfer may also take place e.g. in encrypted form. In some embodiments, the obtainment of the first information may be a trigger for the transfer of the first information to the mobile apparatus. In other embodiments, the obtainment of a request to transfer the first information may be a trigger for the transfer of the first information to the mobile apparatus.

In some embodiments, the format of the first information for transfer is like the format for obtainment or storage. In other embodiments, the first information may be transferred in a different format and/or a different form than that in which it was obtained or is stored.

The method according to the first aspect of the invention comprises, in particular as a counterpart to the transfer of the first information described above, obtaining the first information from a or the apparatus or a or the system. In that case, the first information is usable to determine a first mode of communication for transferring access information to a box installation. By way of example, however, the apparatus or the system from which the first information is obtained is not the box installation.

The method according to the first aspect of the invention further comprises, for example triggered by the obtainment of the first information, determining, using the first information, the first mode of communication for transferring the access information to the box installation, and transferring the access information to the box installation using the first mode of communication in order to obtain access to one or more boxes of the box installation. Another trigger for determining the first mode of communication may be a user input or predetermined use of the mobile apparatus, for example. The first mode of communication may moreover be determined using further information. By way of example, an organization of the apparatus determining the first mode of communication may be taken into consideration. Furthermore, e.g. user inputs may also be used.

In some embodiments, the effect achieved by the methods according to the various aspects of the invention may be that access information is transferred, e.g. by a mobile apparatus, using a, e.g. previously, determined mode of communication without a user needing to input information required therefor on the mobile apparatus and/or the box installation.

According to an illustrative embodiment of all of the aspects of the invention, the determination of the first mode of communication may comprise selecting the first mode of communication from a plurality of modes of communication. In particular, a mobile apparatus performing the method according to the first aspect may be configured to transfer the first information to a box installation using one or more (or all) modes of communication from the plurality of modes of communication.

The method according to the second aspect of the invention, for example performed by the box installation, comprises obtaining the access information using the first mode of communication, the first mode of communication having been determined using the first information, e.g. as described above. By way of example, the obtainment of the access information may be the trigger for performing the further steps of the method according to the second aspect of the invention, i.e. confirming whether the access information authorizes access to one or more boxes of the box installation and granting access to one or more boxes of the box installation, a necessary condition for the granting of access being that it has been confirmed that the access information authorizes access to the one or more boxes of the box installation. When granting access to the box installation or to one or more boxes of the box installation, the box or the multiple boxes of the box installation may be opened and/or the respective doors of the boxes may be unlocked, for example. A necessary condition for this, however, is that it has been confirmed that the access information authorizes access to the box installation or access to the one or more boxes of the box installation that are supposed to be opened or unlocked. In particular, access is not granted to any box, for example, if it has not been or has not been able to be confirmed that the access information authorizes access to the one or more boxes of the box installation, or if it has been confirmed that the access information does not authorize access to the one or more boxes of the box installation. When granting access to one or more boxes of the box installation, it is also fundamentally possible, for example, to deny access to those boxes of the box installation that are not boxes for which it has been confirmed that the access information authorizes access to them. Those boxes are then not opened and/or their respective doors are not unlocked, for example.

Access information may take a wide variety of forms. By way of example, it may be letters, numbers, symbols, patterns, bit sequences or the like. A combination of the aforementioned formats is also possible. Illustrative access information could comprise or consist of 5, 8, 9, 10, 20, 50, a number between the cited values or more or fewer alphanumeric characters. In particular, access information may be e.g. a password, e.g. a password chosen, e.g. at random, by a user or an apparatus. Access information may additionally or instead also contain a user identifier, for example a customer number, particulars, a personal cryptographic key or similar information, e.g. which is uniquely associable with a user. Additionally or alternatively, the access information may be associated with one or more boxes of a box installation, for example by virtue of its authorizing access to these boxes of the box installation. Access information may be graphically representable, readable by human beings and/or machines and/or transferrable electronically and/or by radio, inter alia, to cite just a few examples.

Illustrative embodiments and further advantages of the illustrative aspects of the invention are described below, the disclosure thereof being intended to apply in equal measure in each case to all three aspects of the invention.

According to an illustrative embodiment of all of the aspects of the invention, the first mode of communication may be one of the modes of communication (i)(iv) described below. The first mode of communication may also be a different mode of communication, however, which is not described here.

Mode of communication (i) is a transfer by means of a radio connection, in particular Bluetooth or NFC or a different nearfield radio technology. By way of example, other radio connections are likewise possible, however, e.g. transmission in accordance with what is known as a WiFi (IEEE 802.11) standard or a different standard.

Mode of communication (ii) is a transfer by means of an optical pattern that is displayed on a screen of the mobile apparatus for capture by a capture unit of the box installation. The optical pattern may be a QR code or barcode, for example, but other patterns are also possible. The capture unit may be a scanner for scanning corresponding patterns, for example.

Mode of communication (iii) is a transfer by means of display of the access information on a screen of the mobile apparatus for visual detection by a person, who then inputs the access information on an input unit of the box installation, in particular a keypad or a touch-sensitive screen. The access information may be displayed on the screen of the mobile apparatus as an alphanumeric character string, for example.

Mode of communication (iv) is an acoustic transfer. An acoustic transfer of this kind may take place for example by virtue of an apparatus or a person reading the access information aloud and the box installation capturing the access information by means of voice recognition. The box installation may have an appropriate capture unit for this purpose.

If the determination of the first mode of communication according to an illustrative embodiment of various aspects of the invention comprises selecting the first mode of communication from a plurality of modes of communication, the plurality of modes of communication may, according to an illustrative embodiment of all of the aspects of the invention, comprise one or more (e.g. (i)-(ii), (i)-(iii), (i)-(iv), (ii)-(iii) or a different selection) of the modes of communication (i)-(iv).

A mode of communication may for example require an apparatus and/or a user to be close to the capturing or obtaining box installation (that is to say e.g. at a distance of less than an arm's length, 1 m, 5 m, 10 m, 50 m, 1 km, within the same radio cell, in range of a shortrange radio connection, e.g. an NFC or WLAN or Bluetooth connection, or in sight) in order to transfer access information. Additionally or alternatively, a mode of communication may entail information being able to be transferred or obtained only at a predetermined, e.g. maximum, speed. This applies in particular to the modes of communication (i)-(iv) described above.

An illustrative limit for the maximum and/or achievable speed of transfer/obtainment of access information may be advantageous from the point of view of security. The reason is that an attacker may for example attempt, e.g. as part of a brute force attack, to send a plurality of pieces of access information to a box installation in order to test whether one or more of these pieces of access information authorize access to the box installation or to one or more boxes of the box installation (that is to say that he attempts to guess pieces of access information that authorize access). As a result of the maximum speed of transfer/obtainment, and/or the speed of transfer/obtainment that is achievable in practice, for access information being limited, for example, the amount of time required for transfer per piece of access information may increase. That is to say that an attack based on as many pieces of access information as possible being transferred (that is to say that the attacker wishes to take as many guesses as possible) may then take longer than if the access information were able to be transferred more quickly. Access information is valid only for a limited amount of time, however. The slower the transmission of access information, the fewer pieces of access information an attacker is able to try out in this limited time. The probability of an attacker happening to transfer access information to a box installation that actually authorizes access (that is to say happening to guess correctly) may therefore fall. The illustrative requirement that an apparatus and/or a user needs to be in physical proximity to a box installation in order to transfer the access information to the box installation may also increase the security of the box installation, for example, as a result of the box installation not being able to be attacked from a remote location, for example via the Internet.

In addition, a mode of communication that does not use an Internet connection may achieve the advantage that the box installation that obtains access information and/or the mobile apparatus that transfers the access information do not require an Internet connection at the time of transmission of the access information. This may be advantageous, for example, if a box installation is supposed to obtain the access information from a smartphone for example at a location at which there is no stable Internet connection. This may be the case in an underground car park or in rural areas, for example, where the mobile radio network coverage is not adequate as a basis for the Internet connection. The transmission of first information and/or access information between different apparatuses may certainly still require an Internet connection. However, the precise time at which the Internet connection is available is then of secondary importance, for example, as long as an Internet connection existed at least briefly at some point in time, for example after a consignment was deposited in a box of the box installation and before a user wishes to collect a consignment deposited for him in a box installation. In particular, this allows a box installation to work more reliably at such a location than if an Internet connection to a server is required in order to confirm whether a user wishing to authenticate himself to the box installation is authorized to obtain access to one or more boxes.

As mentioned above, the first mode of communication for transferring access information to a box installation is determinable, in particular by the mobile apparatus, by using the first information. The first information may be in any form in this case, e.g. it may be letters, numbers, symbols, patterns, bit sequences or the like. A combination of the aforementioned formats is also possible. Illustrative first information could comprise or consist of 5, 8, 9, 10, 20, 50, a number between the cited values or more or fewer alphanumeric characters. First information may also be implicit, for example first information may be transferred or obtained by virtue of a message having a predetermined message format, as a result of which the first information results from the message formatting without additional information being inserted into a message.

According to an illustrative embodiment of all of the aspects of the invention, the first information indicates the first mode of communication for transferring the access information to the box installation. By way of example, the mobile apparatus performing the method according to the first aspect of the invention may access a table that comprises a biunique association between the numbers 1-4 and four modes of communication, e.g. the modes of communication (i)-(iv) described above. If the mobile apparatus then obtains one of the numbers 1-4 as first information, it may use the table to directly determine the first mode of communication for transferring the access information to the box installation.

According to a different illustrative embodiment of all of the aspects of the invention, the first information is organization information associated with an organization of a box installation. The box installation may be the box installation to which the access information is transferred using the first mode of communication in order to obtain access to one or more boxes. If the first information is organization information, it does not indicate the first mode of communication immediately and/or directly, for example. Rather, for example the mobile apparatus uses the method according to the first aspect of the invention to first determine the design of the box installation by using the first information, and it then takes the design of the box installation as a basis for determining the first mode of communication.

According to an illustrative embodiment of all of the aspects of the invention, the organization information may be associated with one or more of the organization features a), b) or c) of the box installation that are described below. The organization features a), b) or c) should be understood by way of illustration in this case and the organization information may also be associated with further or other organization features of the box installation or e.g. its environment.

Organization feature a) relates to the availability of a radio communication interface at the box installation. By way of example, the availability may relate to the availability of one specific radio communication interface, e.g. a Bluetooth interface.

Organization feature b) relates to the availability of a capture unit, e.g. an optical and/or acoustic capture unit, at the box installation. An optical capture unit may be e.g. a scanner in this case. Organization feature b) may then also relate to the availability of a scan function, for example, that is to say for example whether only QR codes or only barcodes or both may be captured. The acoustic capture unit may be e.g. a microphone that interacts with a voice recognition unit or with voice recognition software, for example.

Organization feature c) relates to the availability of an input unit, e.g. a touch-sensitive screen or a keypad, at the box installation.

The availability may relate in each case to the presence and/or the specific usability of a respective unit and/or interface, e.g. at a point in time, for a user or for a consignment.

In a further illustrative embodiment of all of the aspects of the invention, the first information is type information, with the result that the first information indicates a type of the box installation or with the result that the first information is usable to determine the type of the box installation. The type of the box installation may relate to the model or the model series of the box installation, for example. If the first information is type information according to this illustrative embodiment, it does not indicate the first mode of communication immediately and/or directly, for example— like the organization information. Rather, for example the mobile apparatus uses the method according to the first aspect of the invention to first determine the type of the box installation by using the first information, and it then takes the type of the box installation as a basis for either first determining the organization, which is related to the type, of the box installation and then, on the basis of this, determining the first mode of communication, or determining the first mode of communication directly on the basis of the type of the box installation.

Otherwise, in an illustrative embodiment, the method according to the second aspect of the invention may comprise outputting deposit information, the deposit information being usable to confirm that a consignment has been deposited in a box of the box installation. In particular, the box installation may first confirm, e.g. by means of a sensor or by way of an input e.g. by a delivery agent or another user, that a consignment has been deposited in a box of the box installation. By way of example, it may react thereto by outputting the deposit information, e.g. to an apparatus or a system according to the third aspect of the invention. By way of example, the deposit information may be output in such a way that it is associable, for example by means of an indicator, with the box in which the consignment has been deposited. By way of illustration, the deposit information may also simultaneously be access information pertaining to the box of the box installation, or it may allow an apparatus to determine access information pertaining to the box of the box installation.

The method according to the third aspect of the invention may in turn comprise the following in an illustrative embodiment: obtaining the deposit information from the box installation and confirming, using the deposit information, that a consignment has been deposited in a box of the box installation, the confirmation that a consignment has been deposited in a box of the box installation being a trigger for the transfer of the first information to the mobile apparatus. By way of example, the method in this embodiment may moreover comprise confirming for which user the consignment has been deposited in the box installation. The first information may then be transferred to the mobile apparatus of this user. The user therefore obtains the first information as a reaction to a consignment having been deposited for him in a box of the box installation.

The deposit information and the first information may be output, or transferred, together, that is to say for example in one message and/or as a reaction to the same event. The pieces of information may also for example be output or transferred separately, however, for example in different messages and/or independently of one another. At least these options may exist for every output and/or transfer of multiple pieces of information of any type that are described in this application.

Further information, the transmission of which is described in this application, is the access information. The access information may be transferred from a mobile apparatus to a box installation in order to obtain access to one or more boxes of the box installation. In this regard, in an illustrative embodiment, the method according to the third aspect may comprise the following: obtaining or determining second information that is usable as the access information or that is required for generating the access information; and transferring the second information to the mobile apparatus, the transfer of the first information and the transfer of the second information being triggered by the same event, for example. The second information may be a password that authorizes access to one or more boxes of the box installation, for example. However, the second information may for example also be information, e.g. encrypted using a public key, that first still needs to be processed, e.g. decrypted using a private key, by a mobile apparatus in order to determine the access information.

In some embodiments, the second information may be obtained indirectly or directly from the box installation. By way of example, the box installation may have determined the second information, e.g. triggered by the depositing of a consignment or a step in the process of depositing a consignment, for this purpose. In other embodiments, however, the second information may be determined using the method according to the third aspect of the invention, for example.

In some embodiments, the second information may be the deposit information described above, that is to say in particular may have the function of the deposit information.

In some embodiments of the method according to the third aspect of the invention, the transfer of the first information and the transfer of the second information to the mobile apparatus may be triggered indirectly or directly by the depositing of a consignment or a step in the process of depositing a consignment. The obtainment of the first information and/or of deposit information and/or of second information may also be a triggering event for transferring the first and second information.

In an illustrative embodiment, the method according to the first aspect of the invention comprises obtaining the second information that is usable as the access information or that is required for generating the access information. The mobile apparatus may obtain the first and the second information from the same apparatus or the same system in this case. Moreover, the obtainment of the first information and the obtainment of the second information may be triggered by the same event, for example the event that may trigger the transfer of the first information and the transfer of the second information in the method according to the third aspect of the invention.

In illustrative embodiments, the method according to the second aspect of the invention may comprise determining the access information by using the second information, for example by virtue of the second information being decrypted and/or otherwise processed. The access information may be determined e.g. as a reaction to obtaining the second information. In other embodiments, however, the determination of the access information may also be triggered by a user input on the mobile apparatus, getting closer than a distance between the mobile apparatus and the box installation, or by the starting of an app, for example. Other and/or additional triggers are also possible.

The methods according to various aspects of the invention may be carried out for a process of collecting at least one consignment from the one or more boxes of the box installation, for example. In an illustrative embodiment of the method according to the third aspect of the invention, it is thus in particular possible for the second information to be obtained or determined and for the second information to be transferred for a process of collecting at least one consignment from the one or more boxes of the box installation. The second information may also be obtained for a process of collecting at least one consignment from the one or more boxes of the box installation in an illustrative embodiment of the method according to the first aspect of the invention.

The methods according to various aspects of the invention may for example additionally or instead also be carried out for a process of depositing at least one consignment in the one or more boxes of the box installation, however. By way of example, the methods according to various aspects of the invention may to this end, by way of illustration, be designed as follows.

In an illustrative embodiment, the method according to the first aspect of the invention comprises transferring a reservation request to an apparatus that is able to determine reservation information, e.g. the apparatus or the system performing the method according to the third aspect of the invention. By way of example, the transfer of the reservation request may be triggered by a user input on a mobile apparatus. For example, a user wishing to deposit a return in a box installation may use an app on his smartphone to click on an interactive interface that starts a reservation process. In the course of the reservation process, the app may then capture data, for example, some or all of which it inserts into the reservation request. As described above for other transfers, the transfer in this case may take place e.g. using an Internet or radio connection, e.g. in encrypted form. The reservation request may be regarded e.g. as a single message, as a portion of a message or else as a sequence of messages or portions of messages.

In an illustrative embodiment, the method according to the second aspect of the invention comprises obtaining the reservation request from the mobile apparatus and determining reservation information, the reservation information indicating a reservation for one or more boxes of the box installation. The reservation in this case may be a reservation for a user to deposit a consignment, for example. In particular, a reservation may mean for example that apart from the user for whom a box is reserved, no other user is supposed to be able to deposit a consignment in the reserved box. The reservation request may be obtained for example as described above for other transfers, e.g. by Internet and/or mobile radio, and/or e.g. in encrypted form.

The reservation information may be determined as a reaction to obtaining the reservation request, for example. In particular, the determination of the reservation information may be accompanied, by way of illustration, by reservation of the one or more boxes of the box installation. The one or more boxes of the box installation may be reserved e.g. for a predetermined time, from a predetermined time onward and/or in a predetermined period. If for example a user reserves a box for 08:00 on the following day, the box may be reserved for example from the time of reservation up until 08:00 on the following day (for example with a predetermined additional amount of time, e.g. 30 minutes). If a user reserves a box for eight hours from now, for example, the box may be reserved for example from the time of reservation up until eight hours from now (for example with a predetermined additional amount of time, e.g. 30 minutes).

Information that is usable to determine for and/or from what time and/or in what period a reservation is supposed to be made may likewise be included in the reservation request or obtained besides the reservation request, for example. The same applies e.g. to information that is usable to determine a size of a box for which the reservation may be made. By way of illustration, further information that e.g. specifies further demands on the box to be reserved, or renders them determinable, e.g. demands on a coolable or heatable box and/or a box with constant humidity, may also each be included in the reservation request or included besides the reservation request. Alternatively or additionally, information that identifies the user or renders him identifiable may also be included in the reservation request or obtained besides the reservation request. The information may in each case have been determined by way of a user input on a mobile apparatus from which the information was obtained, for example.

In an illustrative embodiment of the method according to the first and/or second aspect of the invention, the reservation request may moreover comprise location information or, besides the reservation request, location information associated with the reservation request may be transferred to the apparatus or the system and/or obtained from the apparatus or the system. By way of example, the location information may indicate a location or an area at or in which a user is looking for a box installation having an available box for depositing a consignment. The location information may be determined by GPS or by way of a user input on the mobile apparatus, for example.

Additionally or alternatively, in an illustrative embodiment, the method according to the first and/or second aspect of the invention comprises determining the box installation for which the reservation information indicating the reservation of the one or more boxes of the box installation will be determined from a plurality of box installations. By way of example, the apparatus or the system performing the method according to the second aspect of the invention manages the plurality of box installations. If, by way of illustration, information that renders the user requesting the reservation identifiable was obtained in the method according to the second aspect of the invention, then for example stored preferences of the user and/or statistical data may be taken as a basis for determining a box installation, e.g. a box installation that said user uses regularly. However, the determination of the box installation may also be merely determining the box installation by using information that indicates a box installation, or renders it determinable, for example. By way of example, the information may have previously been captured by a mobile apparatus by means of a user input.

In an illustrative embodiment of the method according to the first and/or second aspect of the invention, the box installation is determined by using (the) location information. As such, it is possible to cause a box installation close to e.g. a residence of the user, his current whereabouts, his workplace, a point of interest (POI) such as a railway station or airport, or another location selected by the user to be determined, for example.

In an illustrative embodiment, the method according to the first and/or second aspect of the invention comprises ascertaining the first information from a plurality of pieces of stored first information, a respective piece of stored first information from the plurality of pieces of stored first information being usable to determine a respective first mode of communication for transferring respective access information to a respective box installation. In particular, for example the information concerning which box installation was e.g. determined previously may be used to ascertain the first information from a plurality of pieces of stored first information.

In an illustrative embodiment, the method according to the second aspect of the invention comprises transferring the reservation information to the mobile apparatus, the transfer of the reservation information and the transfer of the first information being triggered by the same event, for example, e.g. by the obtainment of the reservation request. The reservation information may be used by the mobile apparatus to confirm that a box and/or multiple boxes of a box installation have been reserved, for example.

In an illustrative embodiment of all of the aspects of the invention, the reservation information or at least a portion of the reservation information is usable as the access information. In particular, that is to say that the reservation information may be transferred to the box installation using the first mode of communication, for example in the method according to the first aspect of the invention, in order to obtain access to one or more boxes of the box installation. What has previously been described above for the format of the access information applies to the format of the reservation information, in particular regardless of whether, in the specific case, the reservation information is actually usable as access information and/or is used as access information.

In an illustrative embodiment, the method according to the first aspect of the invention comprises obtaining the reservation information, the reservation information indicating a reservation for the one or more boxes of the box installation for which access is intended to be obtained with the transfer of the access information. The reservation information may be obtained for example as a reaction to the transfer of the reservation request.

In an illustrative embodiment of the method according to the first aspect of the invention, the mobile apparatus may obtain the reservation information and the first information from the same apparatus or the same system, that is to say in particular not from different apparatuses or systems. Rather, the obtainment of the first information and the obtainment of the reservation information may be triggered by the same event, for example, e.g. by the sending of a reservation request that has in turn triggered the determination of reservation information and the transfer of reservation information to the mobile apparatus. By way of example, the first information and the reservation information may be obtained together in one message and/or in different messages, e.g. as a reaction to the same event.

A user obtains the reservation information on his mobile apparatus, e.g. his smartphone, e.g. after he has used an app to trigger a reservation request. After obtaining the reservation information, he may use an app, for example, to display for which box or which boxes and/or which box installation the reservation has been made, or is available. Additionally, the reservation information may be in a form such that the app displays or is able to display further information, e.g. for what predetermined period the box or the boxes are reserved and/or what size and/or other properties the box or the boxes have. By way of example, the app may also display further information, e.g. based on the first information, e.g. the first mode of communication that is supposed to be used to transfer the access information (or the reservation information that is usable as access information) to the box installation. By way of example, the user may then go to the box installation within the reservation period in order to transfer the access information (or the reservation information as access information) to the box installation there using the first mode of communication, in order to obtain access to the one or more reserved boxes of the box installation.

As mentioned above, the reservation information may be determined and the reservation information may be transferred for a process of depositing a consignment in the one or more boxes of the box installation in an illustrative embodiment of the method according to the second aspect of the invention. Equally, the reservation request may be transferred and the reservation information may be obtained for a process of depositing a consignment in the one or more boxes of the box installation in an illustrative embodiment of the method according to the first aspect of the invention.

The exemplary embodiments and illustrative refinements described above for all aspects of the present invention are also intended to be understood as being disclosed in all combinations with one another.

Further advantageous illustrative refinements of the invention may be found in the detailed description that follows for some illustrative embodiments of the present invention, in particular in conjunction with the figures. The figures accompanying the application are intended to be used only for the purpose of clarification, however, rather than for determining the scope of protection of the invention. The accompanying drawings are not necessarily to scale and are intended merely to reflect the general concept of the invention by way of illustration. In particular, features included in the figures are in no way intended to be regarded as a necessary part of the present invention. The order of the individual steps in the flowcharts does not necessarily predetermine the actual (chronological) order of the steps and is merely illustrative. Nevertheless, the steps may occur/be performed chronologically in exactly the sequence as shown in the flowcharts. In addition, they may, but need not, be performed as a reaction to one another.

DETAILED DESCRIPTION

Figure 1:
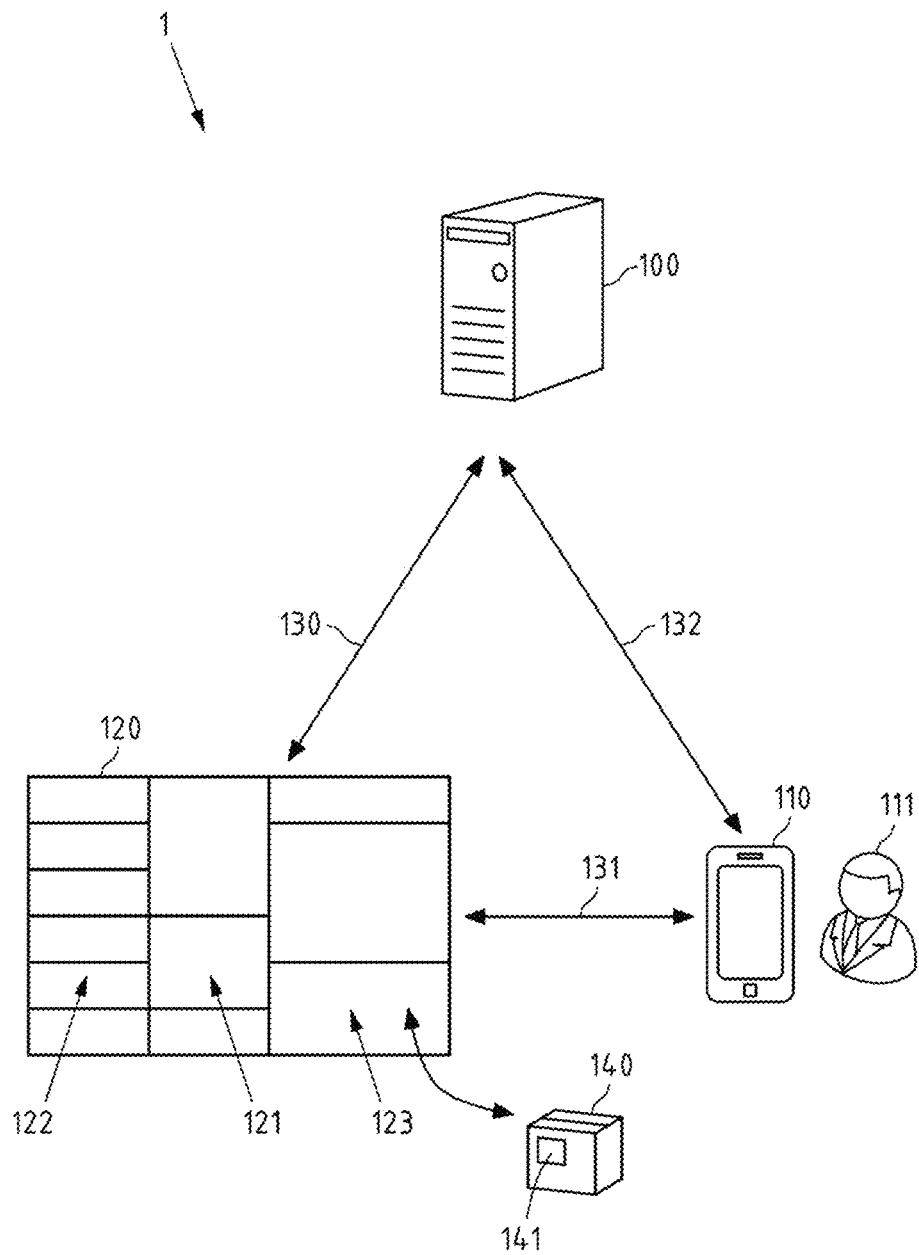
FIG. 1 shows a schematic representation of an illustrative embodiment of a system according to the present invention, by way of illustration comprising a box installation, a mobile apparatus and a server.

FIG. 1 shows a schematic representation of an illustrative embodiment of a system 1 according to the present invention, by way of illustration comprising a box installation 120, a mobile apparatus 110 and a server 100.

The system 1 comprises a box installation 120 having a plurality of boxes, three boxes of which are provided with reference signs 121, 122, 123 in FIG. 1 by way of illustration. Each of the boxes of the box installation 120 is intended to accommodate one or more consignments 140 for a respective individual user 111. An individual user 111 may also have multiple associated boxes. Each box is locked, or closed, in the basic state and may be electrically unlocked, or opened, under the control of instructions and individually by way of a lock control unit provided in the box installation 120, for example. An example of such a box installation 120 is a box installation 120 based on the applicant's known packing station design.

The box installation 120 is equipped with one or more communication interface(s) comprising an interface for wireless communication with the mobile apparatus 110, for example. The wireless communication connection 131 is based for example on optical transmission and/or transmission by means of communication that involves electrical, magnetic or electromagnetic signals or fields, in particular nearfield communication e.g. involving Bluetooth or WLAN.

In some cases, however, the box installation 120 does not comprise an interface for wireless communication with a mobile apparatus 110, for example, or such an interface is unusable, for example in principle or just in certain situations, or is not used even though it would be usable in principle. Additionally or alternatively, there may be a plurality of box installations, of which the box installation 120 is one and some of which provide an interface for wireless communication with a mobile apparatus 110 for use and some do not. If a wireless interface is unavailable, access information that is available on the mobile apparatus 110 and is displayed, for example, may be transferred by a user 111, for example, who inputs this access information or a portion of this access information by way of an input unit or user interface (e.g. a keypad or a touch-sensitive screen with a screen keypad or a voice recognition module) at the box installation 120, for example, and thus transfers it. In addition, by way of illustration, a box installation 120 may also comprise an output unit, e.g. for displaying information, e.g. a screen.

The box installation 120 is for example also configured for communication with the server 100, that is to say for example has a communication interface that allows access to the Internet or to a different network to which the server 100 is connected. The box installation 120 is thus in particular configured for remote communication, that is to say for example has an interface to a cellular mobile radio system, a DSL interface or a local area network (LAN) interface, by means of which it may communicate with the server 100 by way of the communication connection 130. Depending on the situation, the communication connection 130 to the server 100 may be available and/or usable only temporarily, e.g. when the box installation 120 is positioned at a location where there is no stable mobile radio coverage. In various embodiments, however, the box installation 120 is for example not configured to communicate with the server 100 directly or only some of a plurality of box installations are configured to communicate with the server 100 directly. If there is no direct connection 130 to the server 100, box installations 120 may then use a device configured for forwarding data, for example, in order to communicate with the server 100. The device configured for forwarding may exchange information with the server 100 by way of a distance communication interface and information with the box installation 120 by way of a short-range communication interface, for example, and thus forward information from the server 100 to the box installation 120 and vice versa.

The server 100 represents a backend system by way of illustration. The server may e.g. manage and/or communicate with a plurality of box installations, including the box installation 120, and/or a plurality of users, including the user 111. By way of example, the server 100 may communicate with the mobile apparatus 110 of a user 111 by way of a communication connection 132. The communication connection 132 may be e.g. an Internet connection, sections of which also comprise a transmission in a mobile radio network by way of illustration.

In the embodiment described below, the mobile apparatus 110 is the mobile apparatus 110 of the person 111. The person 111 may use the smartphone for example to provide evidence of authorization to access one or more boxes 121, 122, 123 of the box installation 120 to the box installation 120. The person 111 may thus be e.g. a user of the box installation 120. In this context, users may generally be understood to mean for example persons who use/wish to use the box installation 120 to receive and/or send consignments 140 (e.g. parcels, letters, meals, groceries, etc.), and also delivery agents who deposit, or deliver, or collect/wish to collect such consignments 140 in/to or from the box installation 120. A user 111 may be a human being or a machine, e.g. a vehicle, a robot or a drone, to cite just a few examples. If it is the user 111, the mobile apparatus 110 may e.g. also be in the form of a handheld scanner.

A consignment 140 may be deposited for example by a delivery agent, e.g. a human or mechanical delivery agent. To this end, said delivery agent authenticates himself to the box installation 120, for example, and scans the label 141 or other consignment information on the consignment 140 using his handheld scanner, for example. The handheld scanner then transfers the captured information to the box installation 120. Additionally or alternatively, the delivery agent holds the label 141 on the consignment 140 in front of a scanner of the box installation 120 so that the latter is able to scan the label 141 and to capture the consignment information from the consignment 140. A box 123 of the box installation is then opened, for example, and the consignment 140 may be deposited in said box. As soon as the consignment 140 has been deposited, the box 123 is closed again, for example. The box installation 120 then generates for example basic access information, for example based on at least one random or pseudo-random value. Knowledge of this basic access information may allow another apparatus, e.g. the mobile apparatus 110, to generate access information that may then be used for example to prove to the box installation 120 that the mobile apparatus 110 is authorized to access the box 123 of the box installation 120.

In various embodiments, the basic access information is or comprises the access information that may be transferred from the mobile apparatus 110 to the box installation 120, e.g. in plain text. In other embodiments, the generated basic access information may be included by the access information.

Alternatively or additionally, the box installation 120 takes the basic access information as a basis for determining second information for the box 123, e.g. by encrypting the basic access information, inter alia. That is to say that the second information is then e.g. an encrypted form of the basic access information. The encryption may be carried out e.g. using a public key of an asymmetric key pair, the mobile apparatus 110 having access e.g. by way of the related private key of the asymmetric key pair.

The box installation 120 subsequently transfers information to the server 100, for example by way of the communication connection 130 or by way of a device configured to forward data, e.g. the device of the delivery agent who has deposited the consignment 140 and still has a short-range radio communication connection to the box installation 120. The information comprises first information and, by way of illustration, additionally the second information. The first information may be used to indicate a first mode of communication that is supposed to be used to transfer access information to the box installation 120 at a later time. The transferred information may additionally comprise further information, e.g. a consignment identifier of the consignment 140 and/or a user identifier, for example of a recipient of the consignment 140.

The server 100 obtains this information and understands e.g. the second information to be deposit information, as a result of which it confirms that a consignment 140 has been deposited in a box 123 of the box installation 120. The server 100 subsequently takes the consignment identifier and/or the user identifier, for example, as a basis for identifying, or determining, the user 111 and/or the mobile apparatus 110 thereof and transfers information to the mobile apparatus 110. By way of illustration, this information comprises the first information (which the server 100 has obtained from the box installation 120 in this embodiment, but also merely stores e.g. after input by a person in other embodiments) and the second information. In addition, other information may also be transferred in some embodiments, e.g. the identifier of the box installation 120 in which the consignment 140 has been deposited. The mobile apparatus 110 may then use an app, for example, to display to the user 111 that there is a consignment 140 ready for him to collect in the box installation 120. By way of example, the user 111 then has the opportunity to collect the consignment 140 from the box installation 120 within a predetermined period of time, e.g. 9 days.

The user 111 may then go to the box installation 120 within the predetermined period of time and, on his mobile apparatus 110, start the app that has indicated to him that the consignment 140 is ready for him to collect in the box installation 120. Alternatively or additionally, he may use the app in a predetermined manner to trigger performance of the steps described below, e.g. by selecting an interactive interface, e.g. a button entitled "Collect". The mobile apparatus 110 subsequently decrypts the second information, for example, in order to obtain the basic access information encrypted by the box installation 120 in decrypted form and to be able to use it as access information or at least to be able to generate access information on the basis of the decrypted form of the second information, i.e. the basic access information. Moreover, the mobile apparatus 110 uses the first information obtained to determine that the access information is supposed to be transferred to the box installation 120 by way of a transfer by means of a radio connection, in particular Bluetooth. That is to say that the transfer is in particular not supposed to be carried out by way of a transfer by means of an optical pattern that is displayed on a screen of the mobile apparatus 110 for capture by a capture unit of the box installation 120, by way of a transfer by means of display of the access information on a screen of the mobile apparatus 110 for visual detection by the user 111, who then inputs the access information on an input unit of the box installation 120, or by way of an acoustic transfer, even though the mobile apparatus 110 could also have used one or more of these types of transfer.

Subsequently, the mobile apparatus 110 transfers the access information to the box installation 120 by means of a radio connection, in particular Bluetooth. The box installation 120 then confirms whether the access information authorizes access to a box, e.g. the box 123, or to multiple boxes 121, 122, 123 of the box installation 120. By way of example, it confirms this by using the access information that it itself has generated and transferred to the server 100. In the present exemplary embodiment, it then grants access to the box 123 for which the access information authorizes access. The user 111 may then remove the consignment 140 from the box 123. It does not grant access to the boxes 121 and 122 in this exemplary embodiment, since the access information does not authorize access to these boxes 121, 122.

Figure 2:
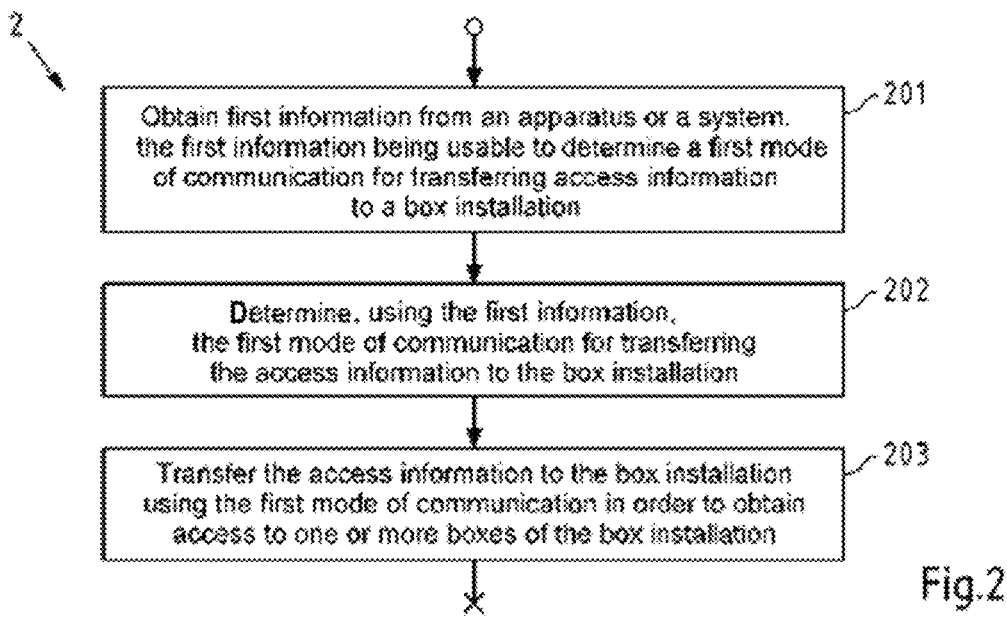
FIG. 2 shows a flowchart for an illustrative embodiment of a method according to the first aspect of the present invention, for example performed and/or controlled by a mobile apparatus.

FIG. 2 shows a flowchart 2 for an illustrative embodiment of a method according to the first aspect of the present invention, for example performed and/or controlled by a mobile apparatus 110.

Step 201 comprises obtaining first information from an apparatus or a system, e.g. the server 100, the first information being usable to determine a first mode of communication for transferring access information to a box installation.

For example, the first information may be organization information associated with an organization of the box installation 120, in particular e.g. may be type information indicating the type, that is to say e.g. the model or the model series, of the box installation 120. By way of illustration, the organization information—or, in this specific case, the type information—indicates that the box installation 120 in whose box 121 a consignment 140 has been deposited for a user 111 is a box installation 120 of type "B". There are for example a plurality of box installations 120 that are for example associated with one another, e.g. by virtue of their being managed by the same server 110 and/or communicating with the same server 100, and some box installations 120 of which are box installations of type "A", some are of type "B" and some are of type "C". By way of illustration, the mobile apparatus 110 has access to an association table that it is able to use to confirm that box installations 120 of type "B" have an optical capture unit, e.g. for a QR code, and a touch-sensitive screen, but not a radio communication interface that may be used to transfer access information to the respective box installation 120. Moreover, by way of illustration, the mobile apparatus 110 has access to a priority table, or priority information, on the basis of which it is able to confirm that the use of a capture unit is preferred over the use of an input unit if these two first modes of communication are available.

By way of example, using such tables, the first mode of communication for transferring the access information to the box installation 120 is determined in step 202 by using the first information. It may be determined for example as a result of the first information being obtained and/or subsequently thereto. An alternative or additional trigger for determining it may be a predetermined input on the mobile apparatus 110, e.g. a user 111 opening an app or selecting an interactive interface in the app.

In regard to the "nature" of the first information, however, it is stressed that it does not have to be organization information. In various embodiments, the first information may indicate the first mode of communication directly, with the result that the mobile apparatus 110 is able to determine the first mode of communication directly, for example, by using a table. The table may then e.g. associate values of the first information, e.g. "00", "01", "10", directly with a respective first mode of communication, e.g. "radio", "optical pattern", or "input".

Step 203 comprises transferring the access information to the box installation 120 using the first mode of communication in order to obtain access to one or more boxes 121, 122, 123 of the box installation 120. Step 203 may also be triggered by one of the preceding steps and/or by an input on the mobile apparatus 110, e.g. the opening of an app or the selection of an interactive interface in the app.

Figure 3:
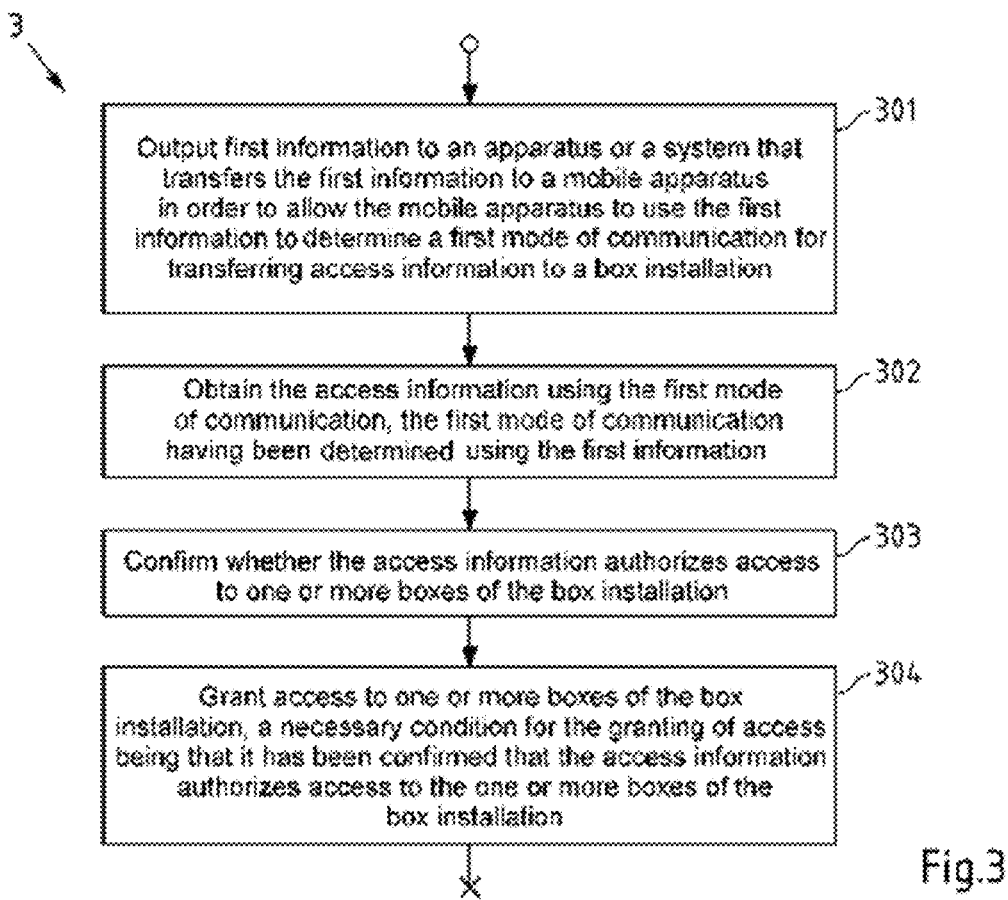
FIG. 3 shows a flowchart for an illustrative embodiment of a method according to the second aspect of the present invention, for example performed and/or controlled by a box installation.

FIG. 3 shows a flowchart 3 for an illustrative embodiment of a method according to the second aspect of the present invention, for example performed and/or controlled by a box installation 120 and/or a system comprising a box installation 120.

Step 301 comprises outputting first information to an apparatus or a system, e.g. the server 100, that transfers the first information to a mobile apparatus 110 in order to allow the mobile apparatus 110 to use the first information to determine a first mode of communication for transferring access information to the box installation 120. A box installation 120 performing this step 301 may have stored the first information, which e.g. indicates its organization and/or its type or renders it determinable. If for example a delivery agent then deposits a consignment 140 in a box 123, this may be a trigger for the output according to step 301. In various embodiments, step 301 may, however, also be performed for example if and/or only if the box installation 120 performing step 301 is e.g. able to communicate with the apparatus or the system again for the first time (in general or after a predetermined time has elapsed).

Step 302 comprises obtaining the access information using the first mode of communication, e.g. from the mobile apparatus 110, the first mode of communication having been determined, e.g. by the mobile apparatus 110, by using the first information. When this step occurs may be dependent on the user 111, for example, and when this user 111 wishes to collect a consignment 140 from the box 123 of the box installation 120. By way of example, step 302 may therefore be performed some minutes, hours, days, weeks or months after step 301.

Step 303 comprises confirming whether the access information authorizes access to one or more boxes 121, 122, 123 of the box installation 120. To this end, the box installation 120 performing step 303 may have appropriate information, e.g. it may use a predetermined hash algorithm with the access information or a portion of the access information as an input value in order to compare the result of the hash algorithm with a, e.g. stored, hash value that authorizes access to the box 123 of the box installation 120. If the result of the comparison is positive, that is to say for example if the compared pieces of information are identical, access to the box 123 may be granted, for example, as described in step 304. In various embodiments, however, the confirmation may additionally or alternatively comprise directly comparing the access information with stored information that authorizes access to one or more boxes of the box installation, for example. In various embodiments, the confirmation may moreover or instead comprise decrypting the access information obtained and comparing the decrypted access information with stored information that authorizes access to one or more boxes 121, 122, 123 of the box installation 120. Furthermore, a validity period may be taken into consideration, for example, with the result that for example access information authorizes access to one or more boxes 121, 122, 123 of the box installation 120 only in a predetermined period.

Step 304 comprises granting access to one or more boxes 121, 122, 123 of the box installation 120, a necessary condition for the granting of access being that it has been confirmed that the access information authorizes access to the one or more boxes 121, 122, 123 of the box installation 120. By way of example, step 304 may be triggered by the conclusion of step 303, in particular by positive confirmation that the access information authorizes access to one or more boxes 121, 122, 123 of the box installation 120.

Figure 4:
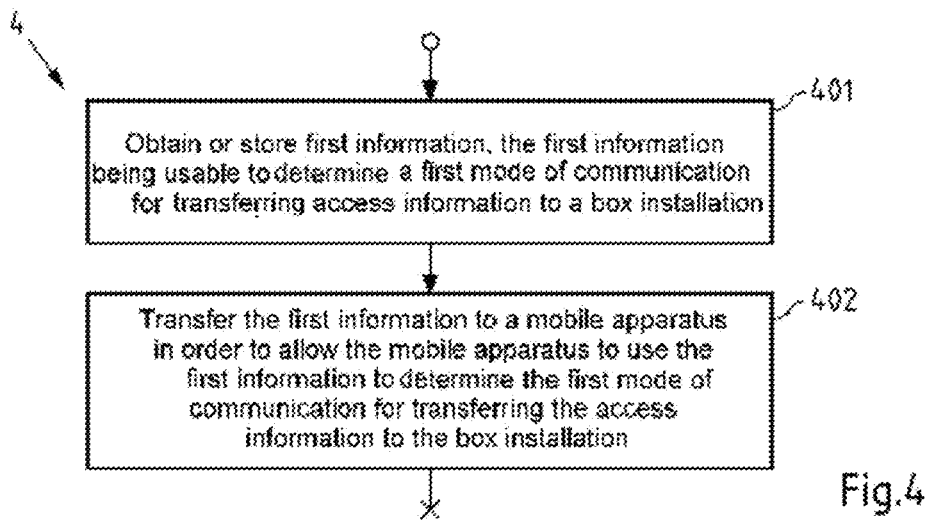
FIG. 4 shows a flowchart for an illustrative embodiment of a method according to the third aspect of the present invention, for example performed and/or controlled by a server.

FIG. 4 shows a flowchart 4 for an illustrative embodiment of a method according to the third aspect of the present invention, for example performed and/or controlled by a server 100.

Step 401 comprises obtaining or storing first information, the first information being usable to determine a first mode of communication for transferring access information to a box installation 120. The apparatus performing step 401 may obtain and/or store a plurality of pieces of first information, a respective piece of stored first information being usable to determine a respective first mode of communication for transferring respective access information to a respective box installation. That is to say for example the apparatus stores first information per box installation for a plurality of box installations. This respective first information may indicate an organization of the respective box installation or render it determinable, for example.

Said first information may be obtained in different ways. By way of example, a user may input the respective first information and/or associate it with a respective box installation 120, e.g. in a user interface of a program or a web page, which at least in part runs on and/or communicates with the apparatus. Additionally or alternatively, it may be obtained from a different apparatus, for example a box installation 120. In step 401, further information may also be obtained or stored, e.g. location information per box installation 120 indicating e.g. where the box installation 120 is situated. Further information such as e.g. the usability of an interface, e.g. at a predetermined time, or the nonusability of an interface, e.g. on account of a technical fault and/or deactivation, may likewise be stored for a respective box installation 120.

All of the information may be stored in such a way that pieces of information relating to the same box installation 120 are associated with one another or associable with one another.

Step 402 comprises transferring the first information to a mobile apparatus 110 in order to allow the mobile apparatus 110 to use the first information to determine the first mode of communication for transferring the access information to the box installation 120. Step 402 may be triggered by the obtainment of the first information in step 401. Additional or alternative triggers are possible, however. In various embodiments, step 402 may be triggered by the obtainment of deposit information that, as described above, may be or comprise second information. A request, e.g. from the mobile apparatus 110, may also trigger the transfer of the first information to the mobile apparatus 110.

The format in which the first information is obtained and/or stored and the format in which the first information is transferred to the mobile apparatus 110 may be identical or different. By way of example, the first information may also be processed as part of the method according to the flowchart 4, e.g. after it has been obtained and before it is transferred. By way of example, the first information may be stored as type information on an apparatus performing the method according to flowchart 4. Before the transfer, the apparatus may then e.g. use a type-to-organization table to determine an organization of the box installation 120 to which the mobile apparatus 110 is supposed to transfer the access information using the first mode of communication. The first information may thus be stored and/or obtained in the form of type information and transferred to the mobile apparatus 110 in the form of organization information. In this respect, the information content of the first information is unchanged as regards the first mode of communication. To put it another way, that is to say that the first information may be independent of a specific form, e.g. as long as the same first mode of communication is determined when determining the first mode of communication, e.g. regardless of whether a type-to-organization table and/or an organization-to-mode-of-communication table is used for the determination.

Figure 5:
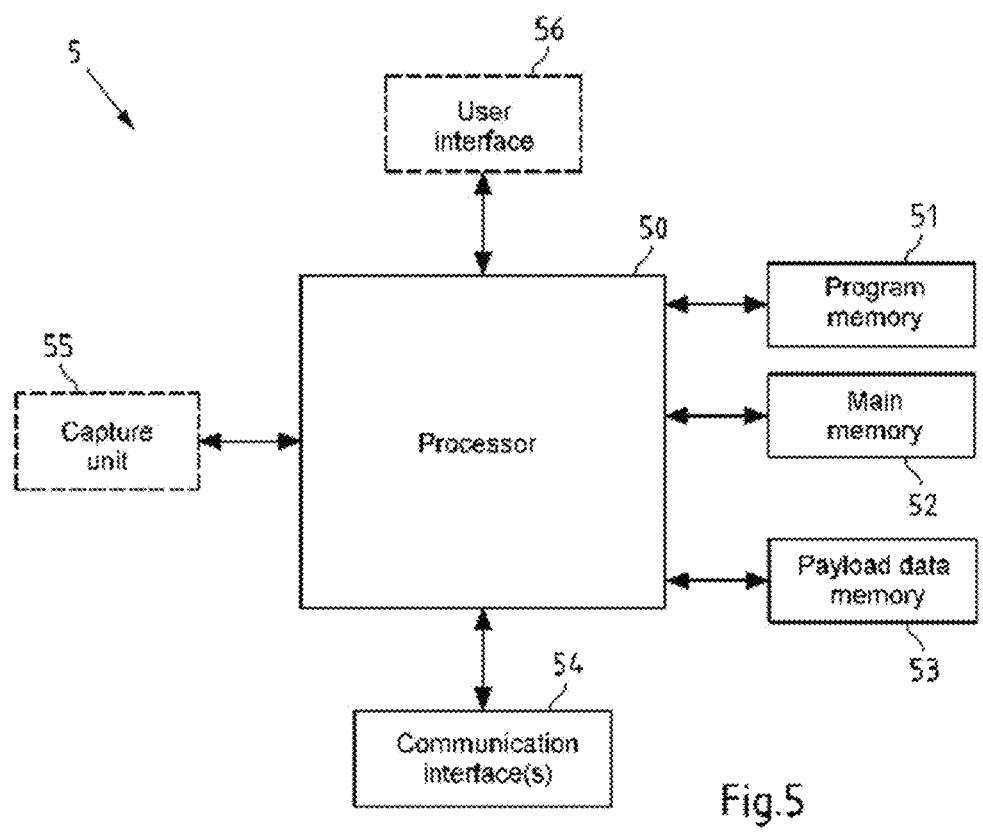
FIG. 5 shows a schematic representation of an illustrative embodiment of an apparatus according to the first aspect of the invention, for example a mobile apparatus.

FIG. 5 is a schematic representation of an illustrative embodiment of an apparatus 5 according to the first aspect of the invention. By way of example, the apparatus 5 may be a portable scanner of a delivery agent/distributor (what is known as a handheld scanner), that is to say a device that is configured to optically capture consignment or delivery data, in particular in the form of 2D or 3D barcodes, from the consignment 140 or delivery. However, the apparatus 5 may also be a smartphone, for example, that is to say in particular a mobile phone with the ability to perform even more complex programs, known as apps, independently. The apparatus 5 may represent the mobile device 110 of the user 111.

The apparatus 5 comprises a processor 50, a program memory 51, a main memory 52, a payload data memory 53, one or more communication interface(s) 54, an optional capture unit 55 for capturing e.g. consignment or delivery data or other information and an optional user interface 56.

By way of example, the processor 50 executes a program according to the first aspect of the invention that is stored in the program memory 51, for example as an app or as firmware. Main memory 52 is used in particular for storing temporary data during the execution of this program.

The payload data memory 53 is used for storing data that are required for the execution of the program, for example one or more pieces of, e.g. first, information, associations or association tables for first information and respective first modes of communication, access information, or reservation information.

The communication interface(s) 54 comprise one or more interfaces for the apparatus to communicate with the server 100, which is an example of the apparatus 7. By way of example, the interface may be based on IP, but, owing to the portability of the apparatus 5, may use a wireless transmission technology as a physical layer that is based for example on cellular mobile radio (e.g. GSM, E-GSM, UMTS, LTE, 5G) or a WLAN (wireless local area network). The communication interface(s) 54 optionally also comprise an interface for communication with the box installation 120, for example based on optical transmission, Bluetooth or NFC. A transmission technology with a comparatively short range, for example less than 100 m or 10 m or 5 m, may be adequate here and even desirable in order to hamper eavesdropping on the transmission by third parties.

The user interface 56 may be in the form of a screen and keypad or in the form of a touch-sensitive display (touchscreen), possibly with additional acoustic and/or haptic signalling units. The display of access information by way of the user interface 56 may obviate the need for a separate interface 54 for communication with the box installation 120 if the access information may be input into a user interface of the box installation 120. The capture unit 55 may be used for capturing information, e.g. the capture unit may be configured to capture QR codes or barcodes or other optical patterns, e.g. consignment or delivery data, e.g. by means of an optical scanning unit. By way of example, the capture unit may additionally be present if the device is the device of a delivery agent/distributor, but for example not if the device is a smartphone of a recipient of a consignment 140.

Figure 6:
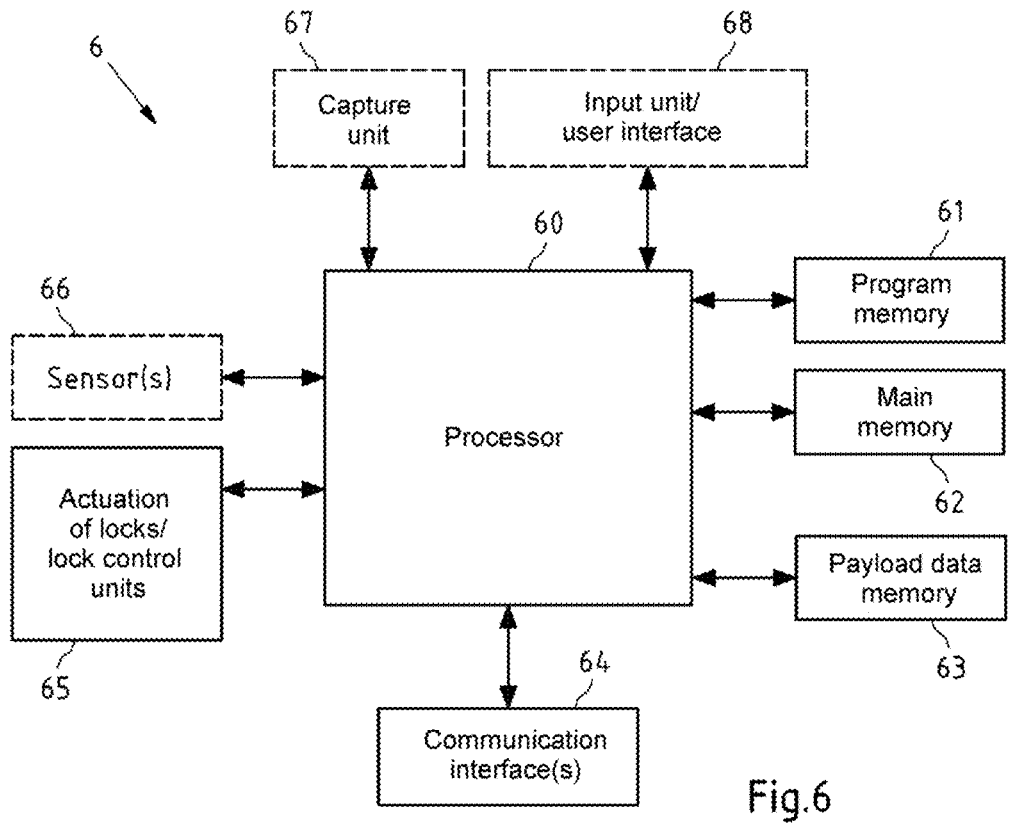
FIG. 6 shows a schematic representation of an illustrative embodiment of an apparatus according to the second aspect of the invention, for example a box installation.

FIG. 6 is a schematic representation of an illustrative embodiment of an apparatus 6 according to the second aspect of the invention. The apparatus 6 may represent a box installation 120 (see FIG. 1) or the control unit thereof, for example.

The apparatus 6 comprises a processor 60, a program memory 61, a main memory 62, a payload data memory 63, one or more communication interface(s) 64, an actuation unit 65 for the locks or lock control units of the boxes of the box installation, one or more optional sensors 66, an optional capture unit 67 and an optional input unit/user interface 68. By way of example, the processor 60 executes a program according to the second aspect of the invention that is stored in the program memory 61, for example as firmware. Main memory 62 is used in particular for storing temporary data during the execution of this program.

The payload data memory 63 is used for storing data that are required for the execution of the program. In the present case, the data may be for example information that may be used by the apparatus 6 to be able to confirm whether access information authorizes access. Further data such as for example first information may also be stored in the payload data memory 63, for example, e.g. in data structures that also represent an association between access information and respective indicators and/or respective boxes.

The communication interface(s) 64 comprise(s) for example an interface for wireless communication with the devices 5 and/or 7, for example by means of optical transmission and/or by means of communication that is based on electrical, magnetic or electromagnetic signals or fields, in particular on Bluetooth, NFC and/or RFID (radio frequency identification). The apparatus 6 (and therefore the box installation 120) is for example also configured for direct communication with the apparatus 7 (and therefore the server 100), that is to say for example has a communication interface that allows access to the Internet or to another network to which the apparatus 7 is connected.

The actuation unit 65 allows a single box 123 of the box installation 120 to be selectively opened or unlocked in order to allow opening, in particular by way of actuation of the lock of the box 123 or a lock control unit of the box 123. Additionally or alternatively, the locking of a box 123 may be caused. The actuation unit 65 is for example connected to all locks or lock control units of the box installation 120 by way of respective wiring or is connected to a bus to which all locks or lock control units of the box installation 120 are also connected.

The sensors 66 are optional and for example box-specific. By way of example, a sensor allows detection of whether there is a respective consignment 140 in a respective box 123 and/or whether a consignment 140 is/has been deposited in the box 123 and/or removed. The same sensor or a further sensor allows e.g. the capture of information relating to a consignment 140, for example by optically scanning a label 141 or reading an NFC tag associated with the consignment 140.

Optionally and in an illustrative embodiment, the capture unit 67 is a scanner that is able to optically capture information, e.g. a barcode or QR code from a screen of a mobile apparatus 5. In a further illustrative embodiment, the capture unit 67 is configured to read NFC tags that are attached to and/or inserted in a respective consignment 140, for example. The capture unit 67 may additionally or alternatively be capable of capturing and processing acoustic signals, that is to say e.g. by means of voice recognition.

The input unit/user interface 68 is optional and configured for communication with a delivery agent/distributor and/or the user 111. This may comprise for example an output unit for displaying (e.g. by way of a screen or by way of box-specific light-emitting diodes (e.g. to show a respective in use/not in use state)) or acoustically outputting information and/or a unit for obtaining information and/or data (e.g. a keypad or a touch-sensitive screen with a screen keypad or a voice recognition module) from the persons.

Figure 7:
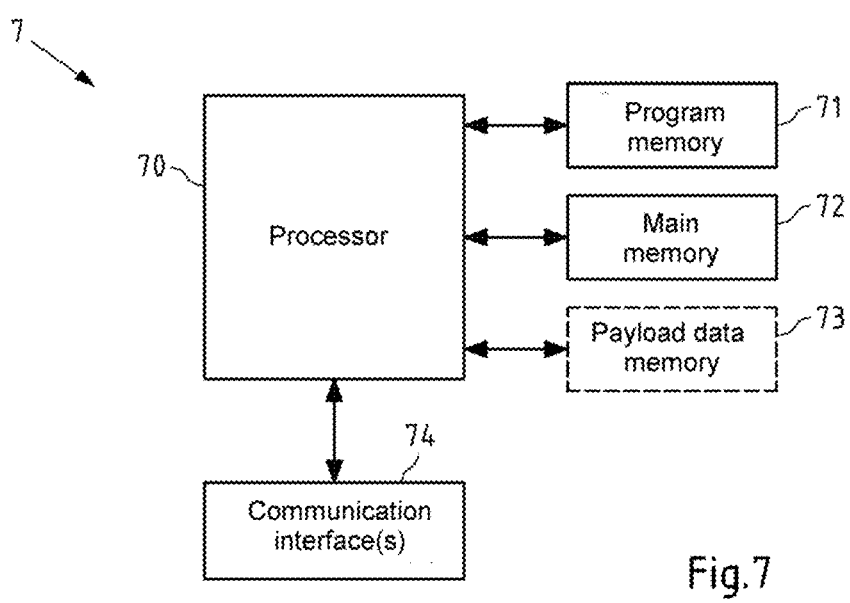
FIG. 7 shows a schematic representation of an illustrative embodiment of an apparatus according to the third aspect of the invention, for example a server.

FIG. 7 is a schematic representation of an illustrative embodiment of an apparatus 7 according to the third aspect of the invention. The apparatus 7 may represent the server 100, for example, which may be a box installation management server, for example.

The apparatus 7 comprises a processor 70, a program memory 71, a main memory 72, an optional payload data memory 73 and one or more communication interface(s) 74. By way of example, the processor executes a program according to the third aspect of the invention that is stored in the program memory 71, for example as firmware. Main memory 72 is used in particular for storing temporary data during the execution of this program.

The payload data memory 73 is used for storing data that are required for the execution of the program. In the present case, the data may be for example first information or other information, e.g. access information. However, they may also be e.g. user identifiers, user contact data, such as email addresses and mobile radio numbers, box installation identifiers and consignment data. All data may be stored in encrypted form, for example. Moreover, the payload data memory 73 may store information about a plurality of box installations 120, for example a respective piece of first information per box installation from the plurality of box installations and/or location information indicating for example a location of a respective box installation 120. The information obtained and to be transferred may also just be buffer-stored in the main memory 72, for example, and erased again immediately after transfer. An illustrative apparatus 7 that merely forwards data then does not necessarily require a payload data memory 73.

The communication interface(s) 74 may comprise at least one interface for communication with other units of the system 1, e.g. with the mobile apparatus 110 and/or the box installation 120. This communication may be based on the Internet protocol (IP), for example. To this end, at least one of the communication interface(s) 74 is embodied as a local area network (LAN) interface, for example.

In the exemplary embodiments in FIG. 5-7, each processor 50, 60, 70 may be a control unit, a microprocessor, a microcontrol unit such as a microcontroller, a digital signal processor (DSP), an application-specific integrated circuit (ASIC) or a field programmable gate array (FPGA), for example. The program memory and/or the payload data memory in the exemplary embodiments in FIG. 5-7 may be for example a persistent memory, such as for example a read-only memory (ROM) store. By way of example, the program memory may be permanently connected to the respective processor 50, 60, 70, but may alternatively also be detachably connected to the respective processor 50, 60, 70, for example as a memory card, floppy disk or optical data storage medium (e.g. a CD or DVD). The main memory of the exemplary embodiments in FIG. 5-7 is used to store temporary results during the execution of the program instructions, for example; by way of example, it is a volatile memory, such as for example a random access memory (RAM) store.

Figure 8:
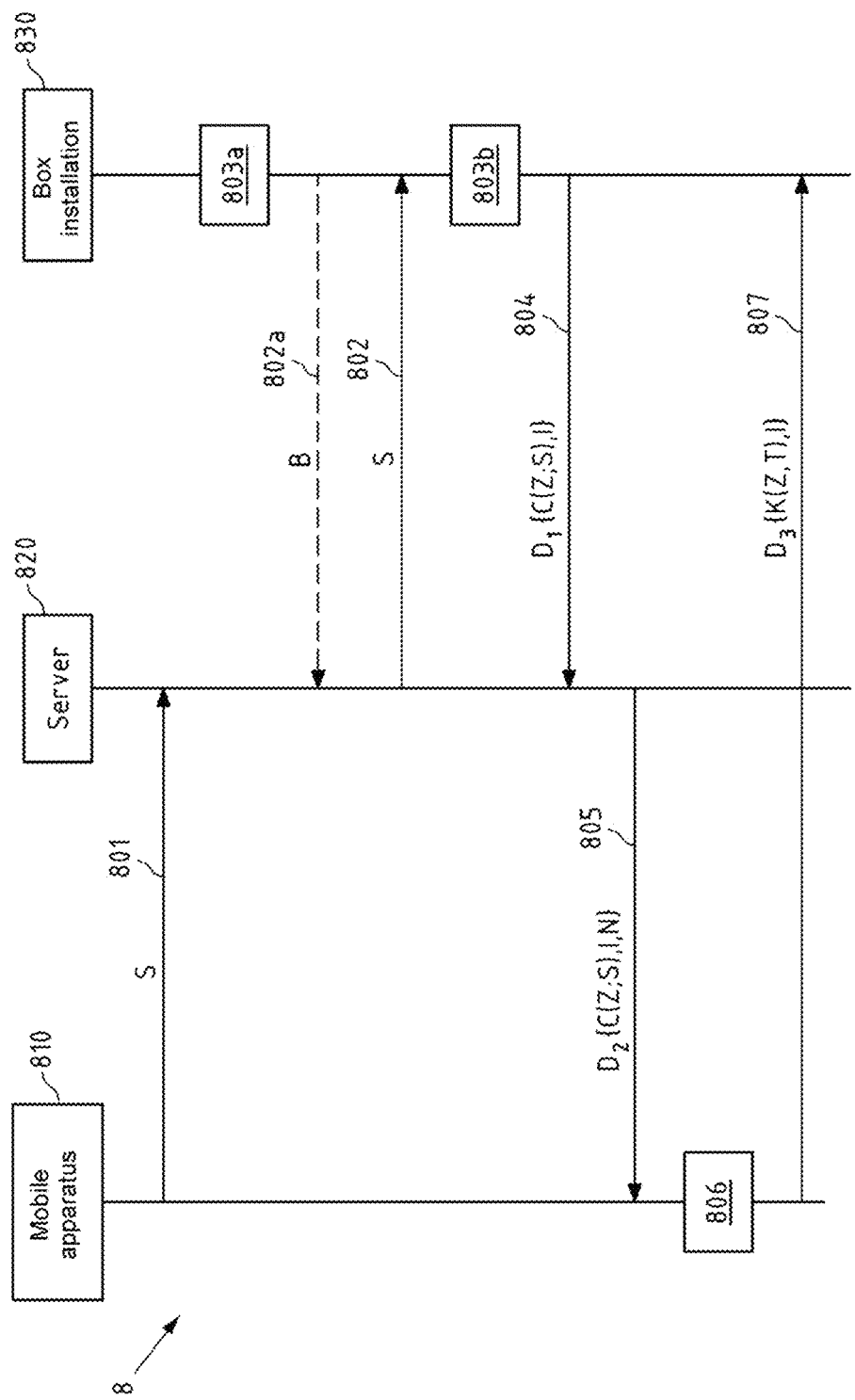
FIG. 8 shows a schematic representation of illustrative data transmissions between apparatuses, in particular between an illustrative mobile apparatus, an illustrative server and an illustrative box installation, each of which performs illustrative embodiments of methods according to a respective aspect of the invention.

FIG. 8 shows a schematic representation of illustrative data transmissions 8 between apparatuses, in particular between an illustrative mobile apparatus 810, an illustrative server 820 and an illustrative box installation 830.

By way of example, the mobile apparatus 810 performs an embodiment of the method according to the first aspect of the invention. By way of example, the mobile apparatus 810 represents the mobile apparatus 110 of the system 1 and/or the apparatus 5. By way of example, the mobile apparatus 810 may be a smartphone or a handheld scanner, e.g. of a delivery agent.

By way of example, the server 820 performs an embodiment of the method according to the third aspect of the invention. By way of example, the server 820 represents the server 100 of the system 1 and/or the apparatus 7.

By way of example, the box installation 830 performs an embodiment of the method according to the second aspect of the invention. By way of example, the box installation 830 represents the box installation 120 of the system 1 and/or the apparatus 6.

The mobile apparatus 810 first generates a key S and transfers it to the server 820 in step 801. By way of illustration, the key S is a public key of an asymmetric key pair and the mobile apparatus 810 stores the related private key of the asymmetric key pair, in particular e.g. without transferring it to the server 820.

The server 820 forwards the key S to the box installation 830 in step 802. In an illustrative embodiment, this is done in response to a request 802*a* from the box installation 830. By way of illustration, the request is used to request from the server 820 that key S that is associated with the user identifier B. By way of example, this request 802*a* may in turn have been triggered by an event 803a, for example the depositing of a consignment 140 for the recipient with the user identifier B in a box of the box installation. In other embodiments or in other situations, the request 802a and/or the event 803a may be dispensed with and the server 820 provides the box installation 830 with the key S, e.g. together with the related user identifier B, in a step 802, e.g. before or independently of whether a consignment for the recipient with the user identifier B has been deposited in a box of the box installation 830.

If, by way of example, a consignment is then deposited in a box of the box installation 830 at a later time, e.g. marked by the event 803b in FIG. 8, this may trigger various steps.

By way of illustration, the box installation 830 first generates basic access information Z, encrypts the basic access information Z using the key S and associates an indicator I with the basic access information Z. The association may be made by way of a table or by means of a list or an array, for example. The indicator may thus be used to allow a box installation, on later obtaining an access request comprising the indicator, to confirm which basic access information needs to be used to confirm whether access information authorizes access. The indicator may also be associated with a box of the box installation 830 in this way.

The box installation 830 may then transfer the basic access information Z (denoted as C(Z; S) in FIG. 8), encrypted using the key, and the indicator I to the server 820 in step 804, e.g. as first data $D_1$ in one data packet or in multiple data packets. In various embodiments, the first data $D_1$ may moreover comprise first information that allows a mobile apparatus 810 to determine a first mode of communication for transferring access information to the box installation 830.

In step 805, after obtaining the data $D_1$, the server 820 outputs/transfers second data $D_2$ to the mobile apparatus 810, e.g. in one data packet or in multiple data packets. The second data $D_2$ comprise at least C(Z; S), the indicator I and first information N, the mobile apparatus 810 being able to use the first information N to determine a first mode of communication for transferring access information to the box installation. The first information N has been determined e.g. by the server 820 by using a database that stores a plurality of pieces of first information for a plurality of respective box installations with a respective association. C(Z; S) and/or I are an example of second information required for generating access information.

After obtaining the second data $D_2$, the mobile apparatus 810 may decrypt the encrypted information C(Z; S), e.g. by using the stored private key of the asymmetric key pair. It may thus obtain the basic access information Z. In connection with an event 806, e.g. as a reaction to the event 806, it may subsequently generate a password K at least on the basis of the basic access information Z. In the present exemplary embodiment, the password is furthermore generated on the basis of a time value T by way of illustration. The event 806 may be e.g. a user input or the confirmation by the mobile apparatus 810 that it is situated close to the box installation 830.

Moreover, the mobile apparatus 810 uses the first information N to determine the first mode of communication for transferring access information to the box installation. By way of illustration, the mobile apparatus 810 determines a transfer by means of an optical pattern as the first mode of communication, said optical pattern being displayed on a screen of the mobile apparatus 810 for capture by a capture unit of the box installation 830.

Accordingly, the mobile apparatus 810 displays third data $D_3$ for transfer 807 to the box installation 830 as an optical pattern, e.g. QR code. This may be done for example after the user approaches the box installation 830 and/or e.g. as a reaction to the user opening an app in a predetermined manner. The user of the mobile apparatus 810 may then hold the mobile apparatus 810 in front of a capture unit of the box installation 830 in such a way that the box installation 830 is able to capture the third data $D_3$. The third data $D_3$ comprise at least the password K(Z,T), generated on the basis of at least the basic access information Z and, by way of illustration, the time value T, and the indicator I. The password K(Z,T) and/or the indicator may be understood as illustrative access information according to one of the aspects of the invention.

After obtaining the access information, the box installation 830 may check whether the access information authorizes access. By way of illustration, it may proceed as follows.

After obtaining the third data, the box installation may take at least the indicator contained in the third data $D_3$ as a basis for determining basic access information Z and a box of the box installation. In the present exemplary embodiment, the box installation 830 then generates three passwords using the same method steps as the mobile apparatus 810 used to generate the password K(Z, T). The box installation 830 then generates a password on the basis of the basic access information Z and the current UNIX time value ($t_0$), rounded to 60 seconds by way of illustration, a further password on the basis of the access information Z and the previous UNIX time value ($t_{-1}$) rounded to 60 seconds, and a further password on the basis of the access information Z and the next UNIX time value ($t_{+1}$) rounded to 60 seconds. The box installation 830 may then compare each of the three passwords with the password K(Z, T) obtained in the third data and for example confirm that the password that it generated on the basis of the basic access information Z and the previous UNIX time value ($t_{-1}$) rounded to 60 seconds matches the password K(Z, T) contained in the third data. The box installation 830 may therefore grant access to the applicable box of the box installation.

It holds for all of the illustrative data transmissions 8 that a transmission represented by an arrow, e.g. 804, but similarly also 801, 802a, 802, 805 or 807, represents either the transfer in one unit, e.g. a packet of a communication protocol, or the transfer in multiple, e.g. including separate, units, e.g. multiple packets of one or more respective communication protocols. A respective transfer may also take place in encrypted form, for example, that is to say in particular e.g. using an encryption that goes beyond the encryption using the key S. Further respective processing steps are also possible, e.g. entropy coding, coding by means of a forward error correction (FEC) code, or signature. This may involve for example encryption and/or processing based on encryption and/or processing that is customary for a respective communication protocol, e.g. Bluetooth, WLAN, 4G or 5G. Unusual and/or additional encryptions and/or processing for respective transmissions are also possible, however.

Many of the exemplary embodiments described above have been described in connection with collection processes, i.e. the illustrative embodiments of the methods according to the respective aspects of the invention have been performed for a process of collecting at least one consignment from one or more boxes of a box installation. Various embodiments may also relate to a process of depositing a consignment in one or more boxes of a box installation, however, as e.g. described below with reference to FIGS. 9 and 10.

Figure 9:
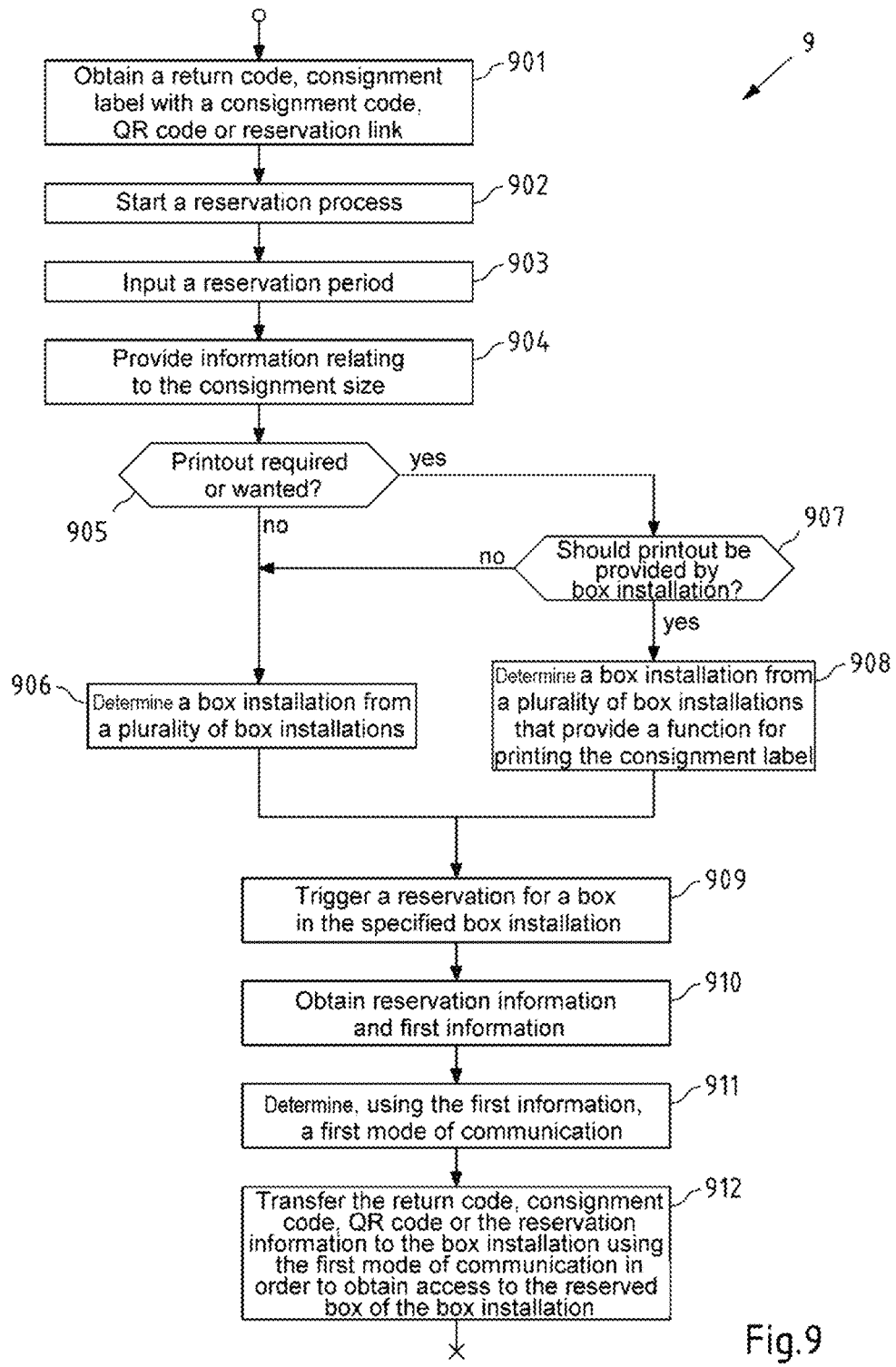
FIG. 9 shows a flowchart for an illustrative embodiment of a method comprising steps according to an illustrative embodiment of the method according to the first aspect of the present invention.

FIG. 9 shows a flowchart 9 for an illustrative embodiment of a method comprising steps according to an illustrative embodiment of the method according to the first aspect of the present invention. Some or all of the steps of the flowchart 9 may be performed by a mobile apparatus by way of illustration. The mobile apparatus is in the form of a smartphone below by way of illustration. In other embodiments, the mobile apparatus may also be a different type of mobile apparatus, however. The same applies to the server, which is merely an example of an apparatus according to the third aspect of the invention here. Moreover, the steps cited below may also be performed by a different apparatus and/or by various apparatuses and/or a system.

An illustrative scenario in which all or part of the flowchart 9 may be executed relates to a user who wishes to deposit a consignment in a box of a box installation, e.g. in order to return the consignment to a trader as a return.

Step 901 comprises obtaining a return code, consignment label with a consignment code, QR code or reservation link. By way of example, the reservation link may be obtained by a user as a reaction to the purchase of a (shipment) consignment. The return code and/or the consignment label with a consignment code may e.g. have been enclosed with a consignment that a user has obtained, e.g. in paper form. The QR code may be provided by a trader server, for example, in order to allow the user to make a return.

A reservation process to reserve a box in a box installation may then be started in step 902. By way of example, this may be carried out by way of a user input in an app on a smartphone of the user and/or by scanning, inputting or importing the previously obtained return code, consignment label, consignment code or QR code.

Alternatively or additionally, the reservation process may be started on a web page or by calling up a web page. The web page may be reachable for example by way of the previously obtained reservation link and/or by way of the app on the smartphone.

A reservation period is determined in step 903 in the reservation process, e.g. in the app on the smartphone, e.g. by way of a user input. By way of example, the user wishes to deposit the consignment in a box of a box installation in the next 8 hours, which means that he inputs a reservation period of 8 hours.

Further information may be requested and/or obtained and/or determined during the reservation process, e.g. on the web page or in the app.

In step 904, information relating to the consignment size of the consignment to be deposited is captured, for example in the app and/or on the web page. The capture may be effected by way of a user input of the dimensions of the consignment. Alternatively or additionally, a photograph of the consignment may be provided, for example, from which it is possible to infer, e.g. by means of image recognition, information relating to the consignment size, e.g. by way of the smartphone or a server.

Step 905 comprises confirming whether a printout e.g. of a consignment label is required and/or wanted. If the user has already obtained a consignment label with a consignment code in paper form, for example, a printout is not required or wanted, for example. The app and/or the server may confirm this without this necessitating a user input, for example, e.g. if the consignment label has previously been scanned. However, a user input may also be used to detect that a user does not need or want a printout (step 905: No).

In some embodiments, step 905 may be carried out in automated fashion and, by way of example, the way in which the reservation process was started in step 902 may be taken as a basis for deciding whether a printout is required or wanted. If e.g. a reservation link was used in step 902, it may be decided in step 905 that a consignment label for sticking on a consignment is still required (step 905: Yes). The user may then be called upon in step 907, e.g. by way of his smartphone, to decide whether the consignment label should be printed by the box installation yet to be determined, in whose box he wishes to deposit his consignment. Depending on the decision, either step 906 (907: No) or step 908 (907: Yes) may then be performed.

The data captured, input or processed in steps 901-905 may be sent to a server in or with a reservation request by the smartphone on which the user triggered the start of the reservation process in step 902 and e.g. input or provided data for steps 903-905 and possibly 907. The reservation request may thus e.g. comprise information that was captured, input or processed in steps 901-905 and/or 907. In addition, the reservation request may comprise further information, e.g. location information. The location information may indicate for example a location at which a user is situated and/or close to which he wishes to deposit the consignment in a box of a box installation. The reservation request may e.g. also be in the form of a sequence of messages, which means that the information from steps 901 and 905 is e.g. sent to the server gradually. However, it is also possible for a reservation request and further information connected to the reservation request to be sent to the server separately, e.g. in different messages.

Step 906 comprises determining a box installation from a plurality of box installations. This step may be performed by different entities.

By way of illustration, the server manages a plurality of box installations and the boxes thereof and knows the occupancy status thereof. It may therefore establish which boxes in which box installations are not in use. After obtaining the reservation request and, by way of illustration, information related thereto, the server may therefore first determine a plurality of box installations that have an available box e.g. for the reservation period and the consignment size. To this end, it filters data relating to box installations that it manages in accordance with the previously obtained information, for example. The server may subsequently take the location information as a basis for determining that box installation from the previously determined plurality of box installations that is closest to the location indicated by the location information, for example. The server may then e.g. send information about the determined box installation to the smartphone. Depending on the embodiment, it is then possible to display to the user, e.g. on the smartphone, which box installation has been determined by the server, and the user may e.g. agree to the selection or determine a different box installation from the plurality of box installations.

Alternatively, the server sends only the determined plurality of box installations that have an available box for the reservation period and the consignment size, by way of illustration, to the smartphone, and the user or the smartphone determines a box installation from the plurality of box installations.

If the box installation is also intended to provide a printout, e.g. of a consignment label (step 907: Yes), the filtering of the data relating to the box installations managed by the server in order to determine the plurality of box installations from which the box installation is subsequently determined may for example also comprise the filtering according to whether a respective box installation provides a function for printing a consignment label. Otherwise, step 908 may proceed like step 907.

Step 909 comprises triggering a reservation for a box in the determined box installation. The triggering may be the capture of a user input on the smartphone, e.g. the acknowledgement that the proposed box installation determined by the server should be selected, and/or may be an applicable acknowledgement message from the smartphone to the server.

The server may then reserve a box in the determined box installation for the previously determined consignment size and the predetermined reservation period and determine corresponding reservation information indicating the reservation of the box in the box installation. Moreover, the server may identify information that indicates, or by means of which it is determinable, which first mode of communication should be used to transfer access information to the determined box installation so that the user can obtain access to the reserved box. The information may be identified e.g. by using (first) information in a database, which (first) information relates e.g. to a plurality of box installations.

The server may then send the reservation information and the first information, which may be used by the smartphone to confirm how access information should be transferred to the box installation in order to obtain access to the reserved box of the box installation, to the smartphone of the user, which obtains the information (step 910).

The smartphone may perform step 911 for example as a reaction to obtaining the information in step 910 or e.g. after a predetermined user input, e.g. in the aforementioned app on the smartphone. Step 911 comprises determining the first mode of communication by using the first information obtained in step 910. By way of illustration, the smartphone may determine that the transfer should be carried out by displaying the access information on a screen of the smartphone for visual detection by the user, who then inputs the access information on an input unit of the box installation, in particular a keypad or a touch-sensitive screen. The smartphone may then inform the user accordingly.

Step 912 comprises transferring the return code, consignment code, QR code or the reservation information to the box installation by using the first mode of communication in order to obtain access to the reserved box of the box installation. The return code, consignment code, QR code or reservation information are examples of information that is usable as access information in different embodiments. In the present exemplary embodiment, the user inputs, by way of illustration, a portion of the reservation information that is displayed on the screen of his smartphone at the box installation in which a box is reserved for him. The box installation then checks whether the access information (i.e. in this case the portion of the reservation information) authorizes access to one or more boxes of the box installation, and by way of illustration grants access to the reserved box.

Figure 10:
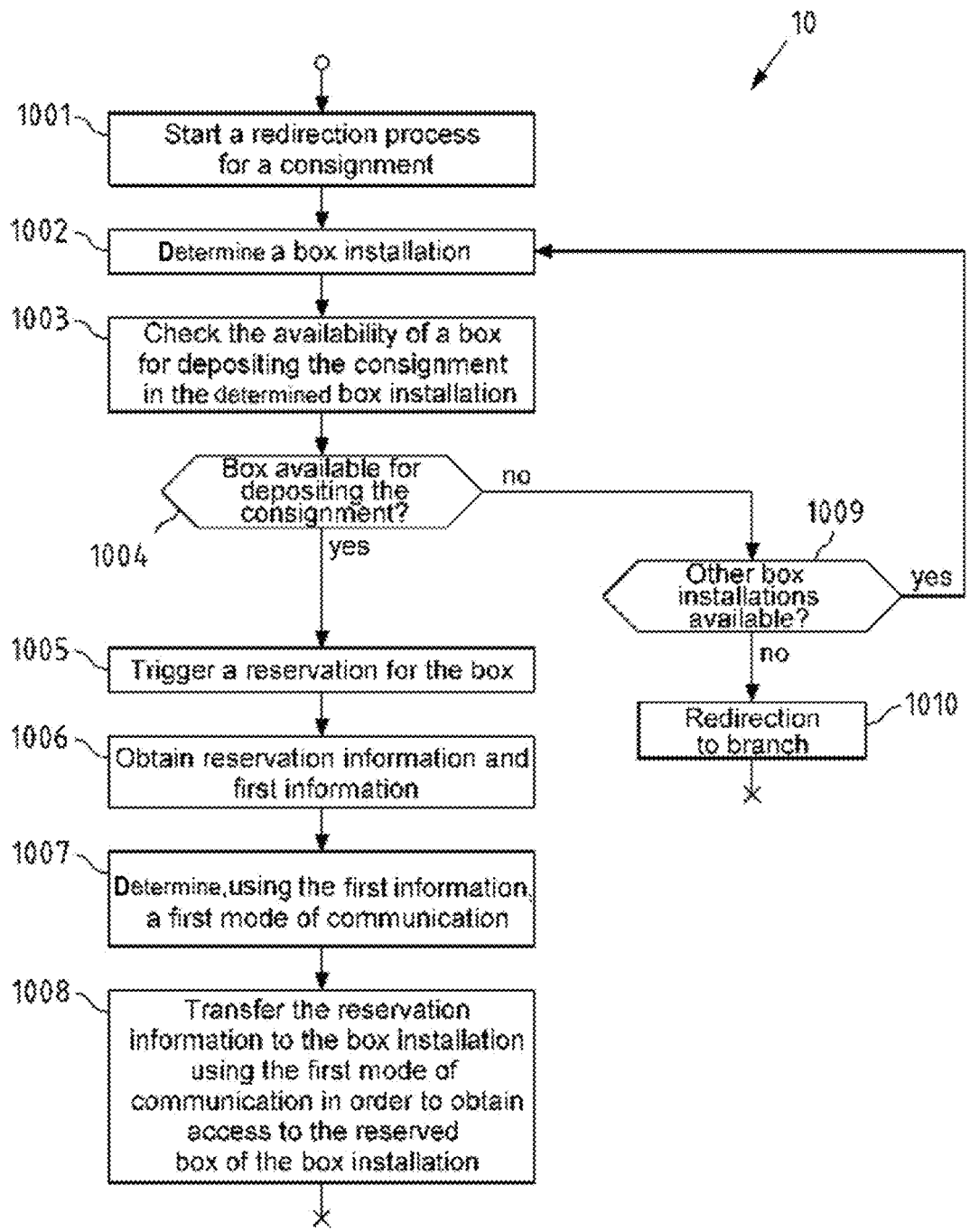
FIG. 10 shows a flowchart for a further illustrative embodiment of a method comprising steps according to an illustrative embodiment of the method according to the first aspect of the present invention.

FIG. 10 shows a flowchart for a further illustrative embodiment of a method comprising steps according to an illustrative embodiment of the method according to the first aspect of the present invention. Some or all of the steps of the flowchart 10 may be performed by a mobile apparatus by way of illustration. The mobile apparatus is in the form of a handheld scanner of a delivery agent below by way of illustration. In other embodiments, the mobile apparatus may also be a different type of mobile apparatus, however. The same applies to the server, which is merely an example of an apparatus according to the third aspect of the invention here. Moreover, the steps cited below may also be performed by a different apparatus and/or by various apparatuses and/or a system.

An illustrative scenario in which all or part of the flowchart 10 may be executed relates to a delivery agent wishing to deposit a consignment in a box of a box installation, e.g. because a house door delivery was unsuccessful.

Step 1001 comprises starting a redirection process for a consignment, e.g. because the consignment was not able to be delivered to the recipient's address. The redirection process may be started e.g. by virtue of the delivery agent using his handheld scanner to make an appropriate user input. By way of example, the redirection process may then take place on the handheld scanner, e.g. by exchanging information with the server, or the handheld scanner may send a redirection request to a server, for example, where the redirection process takes place, e.g. by exchanging information with the handheld scanner.

Step 1002 comprises determining a box installation. Step 1002 may take place in a similar manner to that described for steps 906/908 in flowchart 9, and it may be performed by the handheld scanner and/or the server (if necessary with the cooperation of the delivery agent). In various embodiments, step 1002 may also work differently than step 906, however.

By way of illustration, a box installation is determined on the handheld scanner in this exemplary embodiment, e.g. by capturing a user input that e.g. relates to a box installation identifier or indicates a selection on a map. In this way, the delivery agent may for example select the box installation in which he wishes to deposit the consignment.

Step 1003 comprises checking the availability of a box for depositing the consignment in the determined box installation. By way of example, step 1003 may take place subsequently to the box installation being determined. By way of example, the step is triggered by virtue of the handheld scanner sending an appropriate reservation request for a box in the determined box installation to the server. The reservation request may be in the form described in the exemplary embodiment relating to FIG. 9. In particular, it may e.g. comprise information such as a consignment size, or such information may be sent to the server besides the reservation request. The server may then check whether a box meeting the requirements, e.g. regarding the consignment size, is available for deposit. By way of example, it is available if it is not reserved or used.

If a box is not available for depositing the consignment in the determined box installation (step 1004: No), a test is performed in step 1009 to determine whether other box installations are available. In this case, available may mean e.g. that there are box installations within a predetermined radius around a location, e.g. the whereabouts of the delivery agent, or in a predetermined area, e.g. the region of a delivery agent. If this is the case (step 1009: Yes), a different box installation may be determined, for example, e.g. by using the handheld scanner of the delivery agent, and the steps from step 1002 onward may be executed. If no other box installation is available (step 1009: No), the consignment is for example redirected in step 1010 to a branch from where the recipient of the consignment may collect it.

If a box for depositing the consignment is available in the determined box installation (step 1004: Yes), this may be the trigger for the reservation of a box in step 1005. Alternatively, e.g. a communication from the handheld scanner of the delivery agent to the server acknowledging that the delivery agent wishes to use the available box to deposit the consignment may be a trigger for the reservation according to step 1005.

Otherwise, steps 1005-1008 may take place in the manner described for steps 909-912 in flowchart 9. In particular, that is to say that the handheld scanner may use the first information to determine the first mode of communication in step 1007. In this case, e.g. an organization of the handheld scanner (i.e. the mobile apparatus) and/or user inputs e.g. by the delivery agent may also be taken into consideration. The smartphone described for steps 909-912 may be replaced by the handheld scanner described above.

The illustrative embodiments/exemplary embodiments of the present invention that are described in this specification are also intended to be understood as disclosed in all combinations with one another. In particular, the description of a feature that an embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable. The method steps may be implemented in different ways, and implementation in software (through program instructions), hardware or a combination of the two is conceivable for implementing the method steps. All of the disclosures in this specification are intended to be understood in respect of all of the categories apparatus, method and computer program, which means that for example the description of a method step also discloses a corresponding apparatus comprising means for performing and/or controlling the method step, and a corresponding apparatus configured to control and/or perform the method step.

Terms used in the patent claims such as "comprise", "have", "contain", "include" and the like do not exclude further elements or steps. The wording "at least in part" covers both the "in part" case and the "completely" case. The wording "and/or" is intended to be understood to mean that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device is able to perform the functions of multiple units or devices cited in the patent claims. Reference symbols indicated in the patent claims are not intended to be regarded as limitations for the means and steps employed.

The following embodiments of the invention shall also be disclosed:

Embodiment 1

Method, for example performed by a mobile apparatus, the method comprising:
obtaining first information from an apparatus or a system, the first information being usable to determine a first mode of communication for transferring access information to a box installation;
determining, using the first information, the first mode of communication for transferring the access information to the box installation; and
transferring the access information to the box installation using the first mode of communication in order to obtain access to one or more boxes of the box installation.

Embodiment 2

Method according to embodiment 1, wherein the determining of the first mode of communication comprises selecting the first mode of communication from a plurality of modes of communication.

Embodiment 3

Method according to either of the preceding embodiments, wherein the first mode of communication is one of the modes of communication (i)-(iv):
  (i) a transfer by means of a radio connection, in particular Bluetooth or NFC;
  (ii) a transfer by means of an optical pattern displayed on a screen of the mobile apparatus for capture by a capture unit of the box installation;
  (iii) a transfer by means of display of the access information on a screen of the mobile apparatus for visual detection by a person, who then inputs the access information on an input unit of the box installation, in particular a keypad or a touch-sensitive screen; or
  (iv) an acoustic transfer, for example by virtue of an apparatus or a person reading the access information aloud and the box installation capturing the access information by means of voice recognition.

Embodiment 4

Method according to embodiment 3, insofar as dependent on embodiment 2, wherein the plurality of modes of communication comprises one or more of the modes of communication (i)-(iv).

Embodiment 5

Method according to one of the preceding embodiments, further comprising:
obtaining second information that is usable as the access information or that is required for generating the access information.

Embodiment 6

Method according to embodiment 5, wherein the mobile apparatus obtains the first and the second information from the same apparatus or the same system, and wherein the obtainment of the first information and the obtainment of the second information are triggered by the same event, for example.

Embodiment 7

Method according to either of embodiments 5-6, wherein the second information is obtained for a process of collecting at least one consignment from the one or more boxes of the box installation.

Embodiment 8

Method according to one of the preceding embodiments, further comprising:
transferring a reservation request to an apparatus that is able to determine reservation information;
obtaining the reservation information, the reservation information indicating a reservation for the one or more boxes of the box installation for which access is intended to be obtained with the transfer of the access information, and the reservation information being obtained for example as a reaction to the transfer of the reservation request.

Embodiment 9

Method according to embodiment 8, wherein the reservation request is transferred and the reservation information is obtained for a process of depositing a consignment in the one or more boxes of the box installation.

Embodiment 10

Method according to either of embodiments 8-9, wherein the reservation request comprises location information or wherein, besides the reservation request, location information associated with the reservation request is transferred to the apparatus.

Embodiment 11

Method according to one of embodiments 8-10, wherein the mobile apparatus obtains the reservation information and the first information from the same apparatus or the same system, and wherein the obtainment of the first information and the obtainment of the reservation information are triggered by the same event, for example.

Embodiment 12

Method, for example performed by a box installation, the method comprising:
  outputting first information to an apparatus or a system that transfers the first information to a mobile apparatus in order to allow the mobile apparatus to use the first information to determine a first mode of communication for transferring access information to the box installation;
  obtaining the access information using the first mode of communication, the first mode of communication having been determined using the first information;
  confirming whether the access information authorizes access to one or more boxes of the box installation; and
  granting access to one or more boxes of the box installation, a necessary condition for the granting of access being that it has been confirmed that the access information authorizes access to the one or more boxes of the box installation.

Embodiment 13

Method according to embodiment 12, further comprising:
  outputting deposit information, the deposit information being usable to confirm that a consignment has been deposited in a box of the box installation.

Embodiment 14

Method, for example performed by an apparatus or a system, the method comprising:
  obtaining or storing first information, the first information being usable to determine a first mode of communication for transferring access information to a box installation;
  transferring the first information to a mobile apparatus in order to allow the mobile apparatus to use the first information to determine the first mode of communication for transferring the access information to the box installation.

Embodiment 15

Method according to embodiment 14, further comprising:
  obtaining deposit information from the box installation;
  confirming, using the deposit information, that a consignment has been deposited in a box of the box installation, the confirmation that a consignment has been deposited in a box of the box installation being a trigger for the transfer of the first information to the mobile apparatus.

Embodiment 16

Method according to either of embodiments 14-15, wherein the access information is transferred from the mobile apparatus to the box installation in order to obtain access to one or more boxes of the box installation, the method further comprising:
  obtaining or determining second information that is usable as the access information or that is required for generating the access information;
  transferring the second information to the mobile apparatus, the transfer of the first information and the transfer of the second information being triggered by the same event, for example.

Embodiment 17

Method according to embodiment 16, wherein the second information is obtained or determined and the second information is transferred for a process of collecting at least one consignment from the one or more boxes of the box installation.

Embodiment 18

Method according to either of embodiments 14-15, further comprising:
  obtaining a reservation request from the mobile apparatus;
  determining reservation information, the reservation information indicating a reservation for one or more boxes of the box installation, and the reservation information being determined for example as a reaction to obtaining the reservation request;
  transferring the reservation information to the mobile apparatus, the transfer of the reservation information and the transfer of the first information being triggered by the same event, for example.

Embodiment 19

Method according to embodiment 18, wherein the reservation information is determined and the reservation information is transferred for a process of depositing a consignment in the one or more boxes of the box installation.

Embodiment 20

Method according to either of embodiments 18-19, further comprising:
  determining the box installation for which the reservation information indicating the reservation of the one or more boxes of the box installation will be determined from a plurality of box installations.

Embodiment 21

Method according to embodiment 20, wherein the box installation is determined using location information.

Embodiment 22

Method according to either of embodiments 20-21, further comprising:
ascertaining the first information from a plurality of pieces of stored first information, a respective piece of stored first information from the plurality of pieces of stored first information being usable to determine a respective first mode of communication for transferring respective access information to a respective box installation.

Embodiment 23

Method according to one of the preceding embodiments, wherein the first information is organization information associated with an organization of the box installation.

Embodiment 24

Method according to embodiment 23, wherein the organization information is associated with one or more organization features a), b) or c) of the box installation:
a) the availability of a radio communication interface at the box installation,
b) the availability of a capture unit, e.g. an optical and/or acoustic capture unit, at the box installation,
c) the availability of an input unit, e.g. a touch-sensitive screen or a keypad, at the box installation.

Embodiment 25

Method according to one of the preceding embodiments, wherein the first information is type information, with the result that the first information indicates a type of the box installation or with the result that the first information is usable to determine the type of the box installation.

Embodiment 26

Method according to one of embodiments 1-22, wherein the first information indicates the first mode of communication for transferring the access information to the box installation.

Embodiment 27

Method according to one of the preceding embodiments, insofar as dependent on one of embodiments 8-11 or 18-22, wherein the reservation information or a portion of the reservation information is usable as the access information.

Embodiment 28

Apparatus or system comprising at least two apparatuses, wherein the apparatus or the system is configured to perform and/or control the method according to one of embodiments 1-27 or comprises respective means for performing and/or controlling the steps of the method according to one of embodiments 1-27.

Embodiment 29

Computer program comprising program instructions that cause a processor to perform and/or control the method according to one of embodiments 1-27 when the computer program runs on the processor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, performed by a mobile apparatus, the method comprising:
obtaining first information from an apparatus or a system, the first information being usable to determine a first mode of communication for transferring access information to a box installation;
obtaining second information that is usable as the access information or that is required for generating the access information;
determining, using the first information, the first mode of communication for transferring the access information to the box installation; and transferring the access information to the box installation using the first mode of communication in order to obtain access to one or more boxes of the box installation.

2. A method, performed by (i) a box installation and (ii) an apparatus or a system, the method comprising:
   outputting, by the box installation, first information to the apparatus or the system;
   transferring, by the apparatus or the system, the first information to a mobile apparatus in order to allow the mobile apparatus to use the first information to determine a first mode of communication for transferring access information to the box installation;
   obtaining or determining, by the apparatus or the system, second information that is usable as the access information or that is required for generating the access information;
   transferring, by the apparatus or the system, the second information to the mobile apparatus;
   obtaining, by the box installation, the access information using the first mode of communication, the first mode of communication having been determined using the first information;
   confirming, by the box installation, whether the access information authorizes access to one or more boxes of the box installation; and
   granting access, by the box installation, to one or more boxes of the box installation, a necessary condition for the granting of access being that it has been confirmed that the access information authorizes access to the one or more boxes of the box installation.

3. A method, performed by an apparatus or a system, the method comprising:
   obtaining or storing first information, the first information being usable to determine a first mode of communication for transferring access information to a box installation;
   obtaining or determining second information that is usable as the access information or that is required for generating the access information;
   transferring the first information to a mobile apparatus in order to allow the mobile apparatus to use the first information to determine the first mode of communication for transferring the access information to the box installation;
   transferring the second information to the mobile apparatus and
   wherein the access information is transferred from the mobile apparatus to the box installation in order to obtain access to one or more boxes of the box installation.

4. A mobile apparatus, comprising a processor and a memory, the memory storing a computer program comprising program instructions that cause the processor to perform and/or control:
   obtaining first information from an apparatus or a system, the first information being usable to determine a first mode of communication for transferring access information to a box installation;
   obtaining second information that is usable as the access information or that is required for generating the access information;
   determining, using the first information, the first mode of communication for transferring the access information to the box installation; and
   transferring the access information to the box installation using the first mode of communication in order to obtain access to one or more boxes of the box installation.

5. The mobile apparatus of claim 4, wherein the determining of the first mode of communication comprises selecting the first mode of communication from a plurality of modes of communication.

6. The mobile apparatus of claim 4, wherein the first mode of communication is one of a plurality of modes of communication (i)-(iv):
   (i) a transfer by means of a radio connection, in particular Bluetooth or NFC;
   (ii) a transfer by means of an optical pattern displayed on a screen of the mobile apparatus for capture by a capture unit of the box installation;
   (iii) a transfer by means of display of the access information on a screen of the mobile apparatus for visual detection by a person, who then inputs the access information on an input unit of the box installation, in particular a keypad or a touch-sensitive screen; or
   (iv) an acoustic transfer.

7. The mobile apparatus of claim 4, wherein the mobile apparatus obtains the first and the second information from said apparatus or said system.

8. The mobile apparatus of claim 4, wherein the second information is obtained as part of a process of collecting at least one consignment from the one or more boxes of the box installation.

9. The mobile apparatus of claim 4, further comprising:
   transferring a reservation request to a second apparatus that is able to determine reservation information;
   obtaining the reservation information, the reservation information indicating a reservation for the one or more boxes of the box installation for which access is intended to be obtained with the transfer of the access information.

10. The mobile apparatus of claim 9, wherein the reservation request is transferred and the reservation information is obtained as part of a process of depositing a consignment in the one or more boxes of the box installation.

11. The mobile apparatus of claim 9, wherein the reservation request comprises location information or wherein, besides the reservation request, location information associated with the reservation request is transferred to the second apparatus.

12. The mobile apparatus of claim 9, wherein the mobile apparatus obtains the reservation information and the first information from said second apparatus or said system.

13. The mobile apparatus of claim 4, wherein the first information is organization information associated with an organization of the box installation.

14. The mobile apparatus of claim 13, wherein the organization information is associated with one or more organization features a), b) or c) of the box installation:
   a) availability of a radio communication interface at the box installation,
   b) availability of a capture unit at the box installation,
   c) availability of an input unit at the box installation.

15. The mobile apparatus of claim 4, wherein the first information is type information, with a result that the first information indicates a type of the box installation or with the result that the first information is usable to determine the type of the box installation.

16. An apparatus or a system, the apparatus or the system comprising a processor and a memory, the memory storing a computer program comprising program instructions that cause the processor to perform and/or control:
  obtaining or storing first information, the first information being usable to determine a first mode of communication for transferring access information to a box installation;
  obtaining or determining second information that is usable as the access information or that is required for generating the access information;
  transferring the first information to a mobile apparatus in order to allow the mobile apparatus to use the first information to determine the first mode of communication for transferring the access information to the box installation;
  transferring the second information to the mobile apparatus and
  wherein the access information is transferred from the mobile apparatus to the box installation in order to obtain access to one or more boxes of the box installation.

17. The apparatus or the system of claim 16, further comprising:
  obtaining deposit information from the box installation;
  confirming, using the deposit information, that a consignment has been deposited in a box of the box installation, the confirmation that a consignment has been deposited in a box of the box installation being a trigger for the transfer of the first information to the mobile apparatus.

18. The apparatus or the system of claim 16, wherein the second information is obtained or determined and the second information is transferred as part of a process of collecting at least one consignment from the one or more boxes of the box installation.

19. The apparatus or the system of claim 16, further comprising:
  obtaining a reservation request from the mobile apparatus;
  determining reservation information, the reservation information indicating a reservation for one or more boxes of the box installation;
  transferring the reservation information to the mobile apparatus.

20. A system comprising:
  a box installation comprising a first processor and a first memory, the first memory storing a first computer program comprising first program instructions that cause the first processor to perform and/or control:
    outputting first information to an apparatus or a system that transfers the first information to a mobile apparatus in order to allow the mobile apparatus to use the first information to determine a first mode of communication for transferring access information to the box installation;
    obtaining the access information using the first mode of communication, the first mode of communication having been determined using the first information;
    confirming whether the access information authorizes access to one or more boxes of the box installation; and
    granting access to one or more boxes of the box installation, a necessary condition for the granting of access being that it has been confirmed that the access information authorizes access to the one or more boxes of the box installation; and
  one or more servers of a backend system comprising a second processor and a second memory, the second memory storing a second computer program comprising second program instructions that cause the second processor to perform and/or control:
    obtaining the first information;
    obtaining or determining second information that is usable as the access information or that is required for generating the access information;
    transferring the first information to the mobile apparatus;
    transferring the second information to the mobile apparatus.

21. The system of claim 20, wherein the first program instructions further cause the first processor of the box installation to perform and/or control:
  outputting deposit information, the deposit information being usable to confirm that a consignment has been deposited in a box of the box installation.

* * * * *